(12) United States Patent
Yeo et al.

(10) Patent No.: US 12,092,961 B2
(45) Date of Patent: Sep. 17, 2024

(54) SEMICONDUCTOR DEVICE MANUFACTURING METHOD AND EXTREME ULTRAVIOLET MASK MANUFACTURING METHOD

(71) Applicant: Samsung Electronics Co., Ltd., Suwon-si (KR)

(72) Inventors: Sang Chul Yeo, Osan-si (KR); Dongwon Kang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 485 days.

(21) Appl. No.: 17/537,700

(22) Filed: Nov. 30, 2021

(65) Prior Publication Data
US 2022/0326622 A1    Oct. 13, 2022

(30) Foreign Application Priority Data
Apr. 8, 2021    (KR) .................... 10-2021-0046091

(51) Int. Cl.
*G03F 7/00*       (2006.01)
*G03F 1/24*       (2012.01)
*G06F 30/30*      (2020.01)

(52) U.S. Cl.
CPC ............ *G03F 7/70441* (2013.01); *G03F 1/24* (2013.01); *G03F 7/70033* (2013.01); *G06F 30/30* (2020.01)

(58) Field of Classification Search
CPC .... G03F 7/70441; G03F 1/24; G03F 7/70033; G03F 1/70; G03F 1/36; G06F 30/30; G06F 30/20; G06F 30/398; G06F 2119/18
See application file for complete search history.

(56) References Cited

U.S. PATENT DOCUMENTS

| | | | |
|---|---|---|---|
| 8,572,520 B2 | 10/2013 | Chou et al. | |
| 9,430,607 B2 | 8/2016 | Tao et al. | |
| 9,557,639 B2 | 1/2017 | Kim et al. | |
| 10,025,175 B2 | 7/2018 | Tsai et al. | |
| 10,483,081 B2 | 11/2019 | Park et al. | |
| 10,534,255 B2 | 1/2020 | Quaglio et al. | |
| 10,657,213 B2 | 5/2020 | Ungar | |
| 10,762,383 B2 | 9/2020 | Shiratsuchi | |
| 10,839,131 B2 | 11/2020 | Liu et al. | |
| 11,704,471 B2* | 7/2023 | Liu .................... | G03F 7/705 716/51 |
| 2020/0064728 A1 | 2/2020 | Misaka et al. | |
| 2020/0081336 A1* | 3/2020 | Choi .................... | G03F 1/36 |
| 2021/0072637 A1 | 3/2021 | Yeo et al. | |

* cited by examiner

*Primary Examiner* — Nghia M Doan
(74) *Attorney, Agent, or Firm* — Muir Patent Law, PLLC

(57) ABSTRACT

Provided is an extreme ultraviolet (EUV) mask manufacturing method of forming an optimum pattern on a wafer by efficiently reflecting a mask topography effect or a coupling effect between edges of a pattern and improving the accuracy of an EUV mask image. The EUV mask manufacturing method includes performing an optical proximity correction (OPC) method for obtaining EUV mask design data, transferring the EUV mask design data as mask tape-out (MTO) design data, preparing mask data based on the MTO design data, and completing an EUV mask by exposing an EUV mask substrate based on the mask data, wherein the performing of the OPC method applies a coupling filter to both a first case in which angles of an edge pair satisfy $|\theta 1-\theta 2|=0$, and a second case in which angles of an edge pair satisfy $0<|\theta 1-\theta 2|\leq$ an angle tolerance.

20 Claims, 20 Drawing Sheets

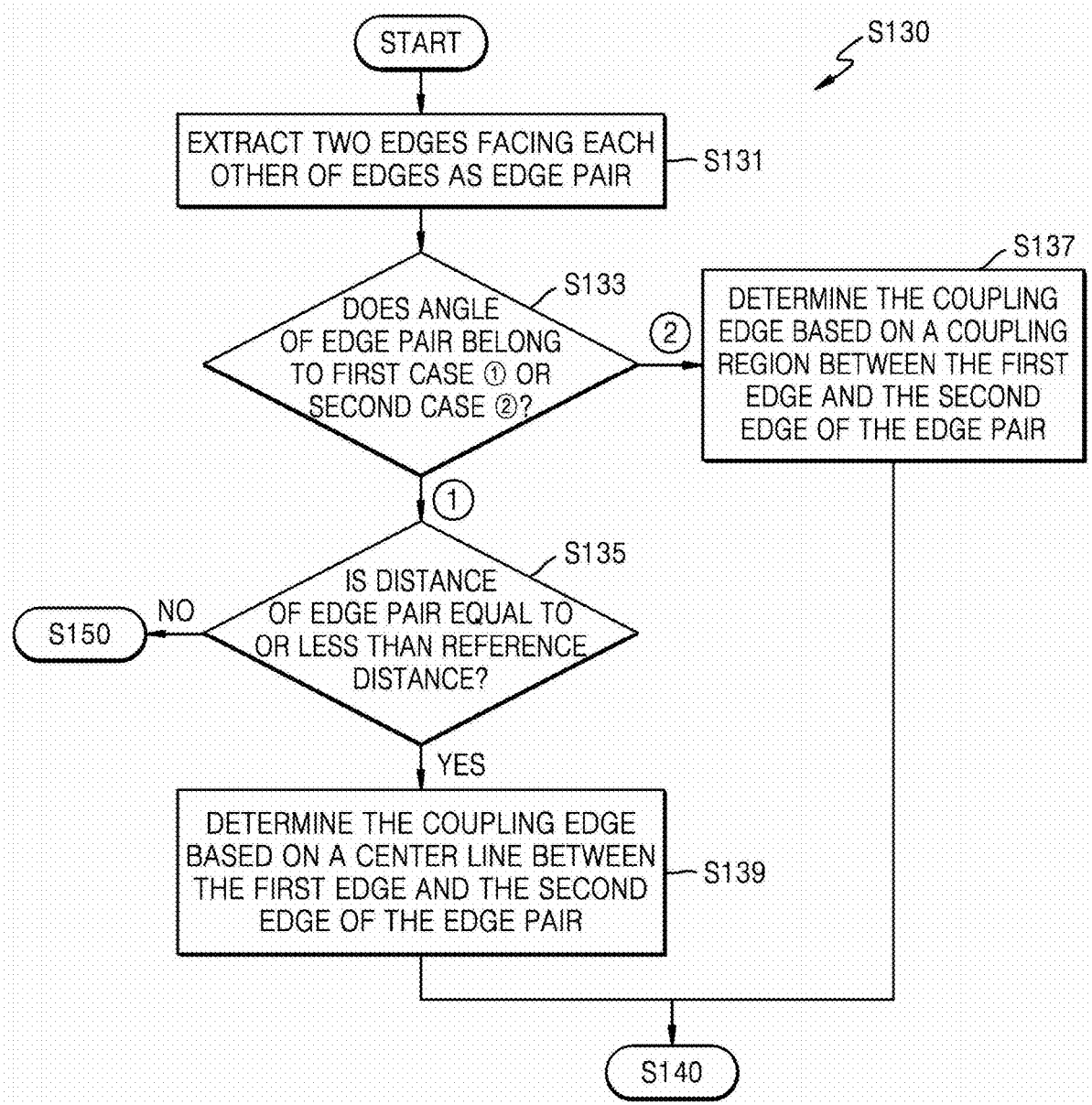

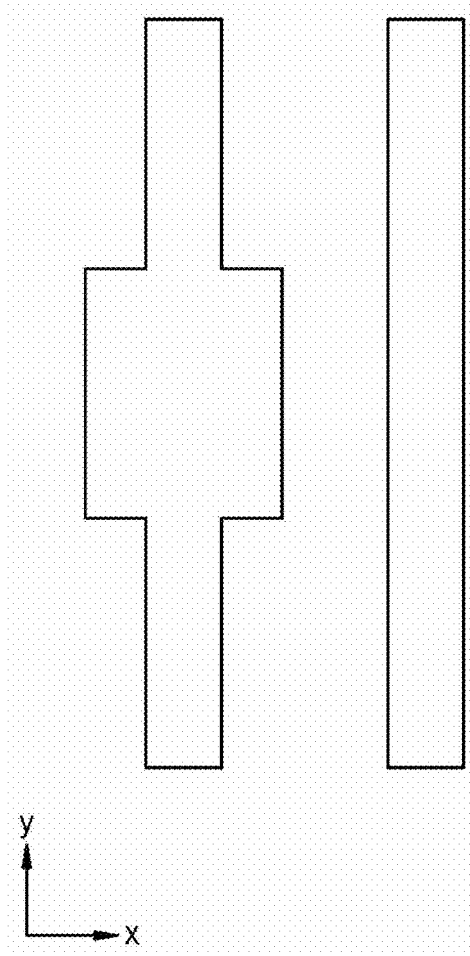

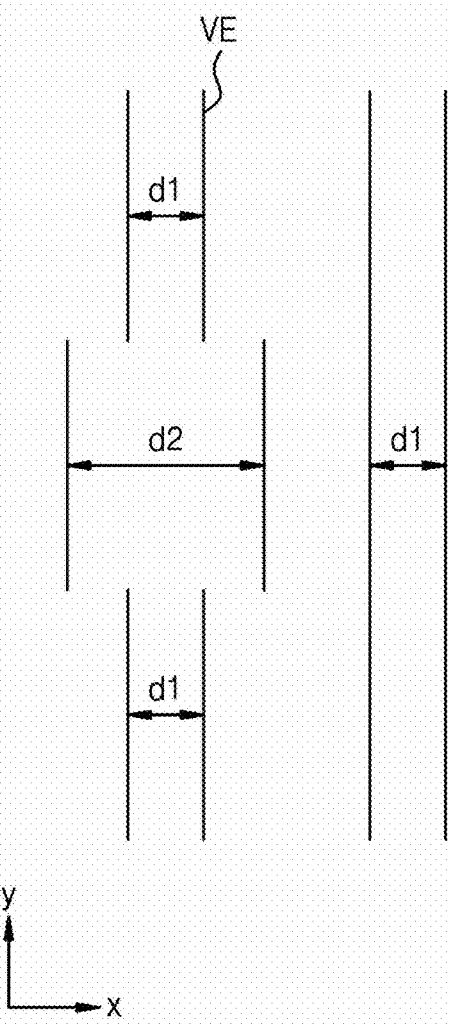

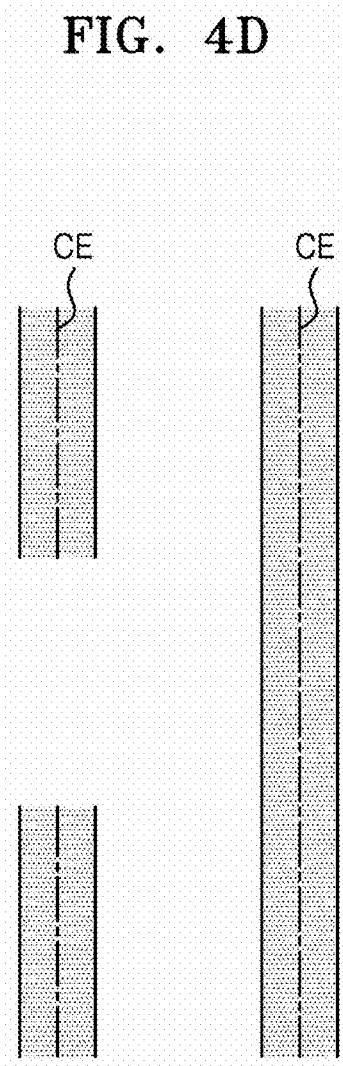

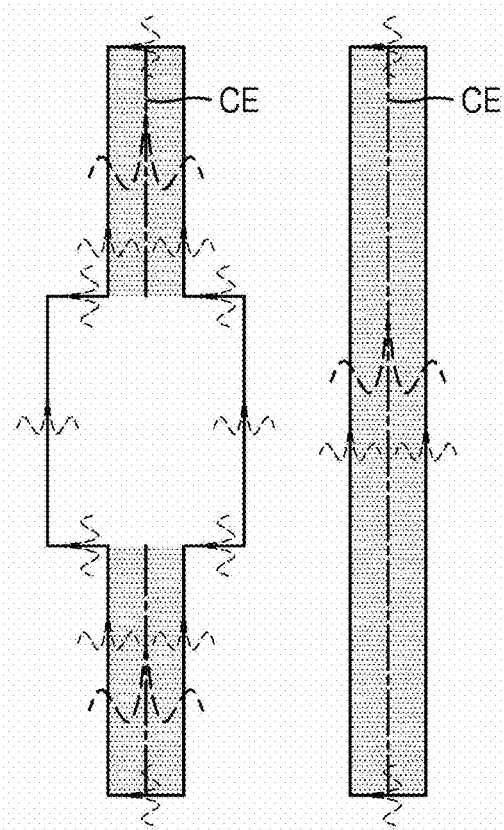

FIG. 7A
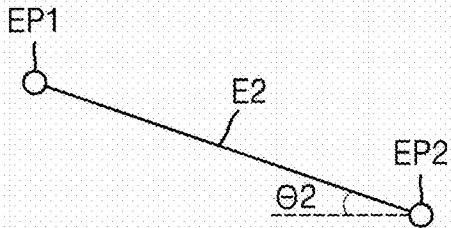
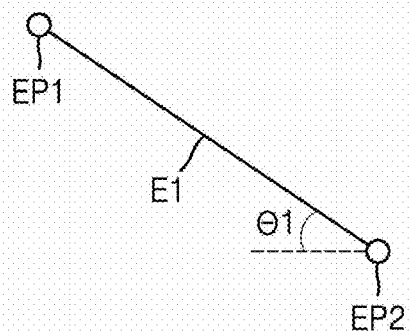
FIG. 7B
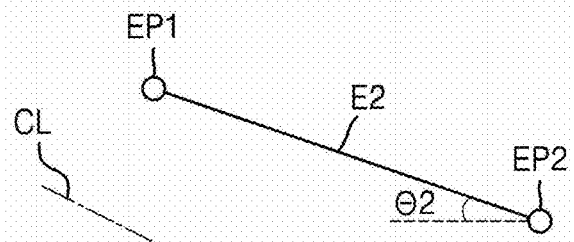
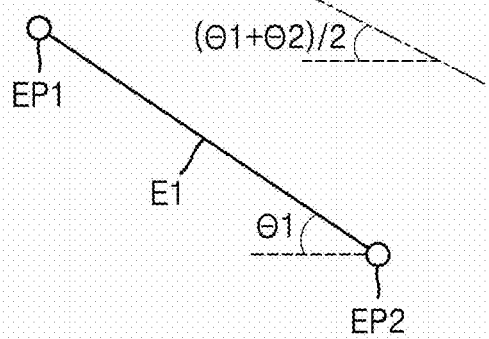

FIG. 9A
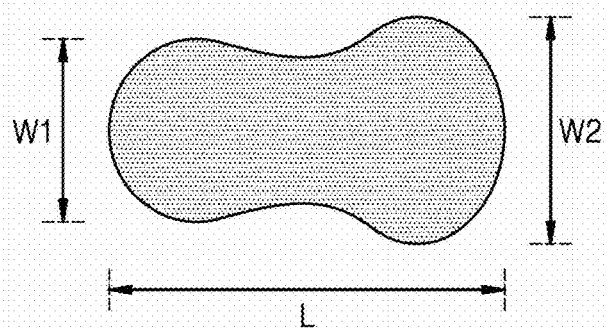
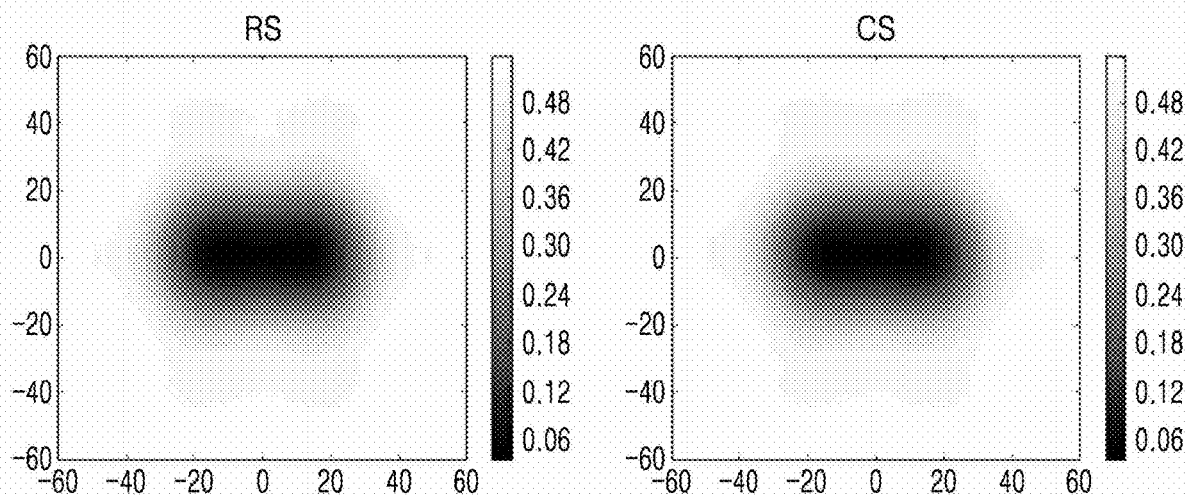

SEMICONDUCTOR DEVICE MANUFACTURING METHOD AND EXTREME ULTRAVIOLET MASK MANUFACTURING METHOD

CROSS-REFERENCE TO RELATED APPLICATION

This application is based on and claims priority under 35 U.S.C. § 119 to Korean Patent Application No. 10-2021-0046091, filed on Apr. 8, 2021 in the Korean Intellectual Property Office, the disclosure of which is incorporated by reference herein in its entirety.

BACKGROUND

The inventive concept relates to a mask manufacturing method, and more particularly, to an extreme ultraviolet (EUV) mask manufacturing method used in an EUV exposure process.

In a semiconductor fabricating process, a photolithography process using an EUV mask may be performed to form a fine pattern on a semiconductor substrate such as a wafer. The EUV mask may be simply defined as a pattern transfer body in which a pattern shape of an opaque material is formed on a transparent base material, such as quartz. In briefly describing an EUV mask manufacturing process, first, a required circuit and a layout for the required circuit may be designed, and then, EUV mask design data obtained by using optical proximity correction (OPC) may be transferred as mask tape-out (MTO) design data. Thereafter, mask data preparation (MDP) may be performed based on the MTO design data, and the EUV mask may be manufactured by performing front end of line (FEOL) such as an exposure process and back end of line (BEOL) such as defect inspection.

SUMMARY

Aspects of inventive concept provides an extreme ultraviolet (EUV) mask manufacturing method of forming an optimum pattern on a wafer, by improving the accuracy of an EUV mask image by efficiently reflecting a mask topography effect or a coupling effect between edges of the pattern.

According to aspects of the inventive concept, there is provided a manufacturing method including: generating a first EUV mask image by applying thin mask approximation to a pattern on an EUV mask; determining whether an angle of an edge pair constituted by two edges facing each other of edges of the pattern on the EUV mask is equal to or less than an angle tolerance; performing, in response to the angle of the edge pair being equal to or less than the angle tolerance, a process that includes: applying a coupling filter to a coupling edge; generating a second EUV mask image by applying an edge filter to each of the edges; generating a final EUV mask image by adding the first EUV mask image to the second EUV mask image; and generating an optical proximity correction (OPC) model based on the final EUV mask image, and obtaining EUV mask design data by performing simulation by using the OPC model; and manufacturing at least one of an EUV mask and a semiconductor device based on the EUV mask design data.

In addition, according to aspects of the inventive concept, there is provided a manufacturing method including: generating a first EUV mask image by applying thin mask approximation to a pattern on an EUV mask; determining whether an angle of an edge pair constituted by two edges facing each other of edges of the pattern on the EUV mask is equal to or less than an angle tolerance, wherein the two edges include a first edge having a first angle $θ1$ and a second edge having a second angle $θ2$ with respect to a reference line; performing, in response to the angle of the edge pair being equal to or less than the angle tolerance, a process that includes: applying a coupling filter to a coupling edge; generating a second EUV mask image by applying an edge filter to each of the edges; generating a final EUV mask image by adding the first EUV mask image to the second EUV mask image; generating an optical proximity correction (OPC) model based on the final EUV mask image, and obtaining EUV mask design data by performing simulation by using the OPC model; transferring the EUV mask design data as mask tape-out (MTO) design data; preparing mask data based on the MTO design data; and manufacturing at least one of an EUV mask and a semiconductor device by exposing an EUV mask substrate based on the mask data, wherein when the angle is equal to or less than the angle tolerance, an angle of the edge pair includes a first case in which $|θ1-θ2|=0$, and a second case in which $0<|θ1-θ2|≤$ the angle tolerance, wherein, in the first case, a center line between the first edge and the second edge is set as the coupling edge, and wherein in the second case, the coupling edge is set based on a coupling region located between the first edge and the second edge.

Furthermore, according to aspects of the inventive concept, there is provided a manufacturing method including: performing an optical proximity correction (OPC) method for obtaining EUV mask design data; transferring the EUV mask design data as mask tape-out (MTO) design data; preparing mask data based on the MTO design data; and manufacturing at least one of an EUV mask by exposing an EUV mask substrate based on the mask data and a semiconductor device based on the mask data, wherein the performing of the OPC method includes: generating a first EUV mask image by applying thin mask approximation to a pattern on an EUV mask; determining whether an angle of an edge pair constituted by two edges facing each other of edges of the pattern on the EUV mask is equal to or less than an angle tolerance; performing, in response to the angle of the edge pair being equal to or less than the angle tolerance, a process that includes: applying a coupling filter to a coupling edge; generating a second EUV mask image by applying an edge filter to each of the edges; generating a final EUV mask image by adding the first EUV mask image to the second EUV mask image; generating an OPC model based on the final EUV mask image; and obtaining EUV mask design data by performing simulation by using the OPC model.

BRIEF DESCRIPTION OF THE DRAWINGS

Embodiments of the inventive concept will be more clearly understood from the following detailed description taken in conjunction with the accompanying drawings in which:

FIG. 2 is a more detailed flowchart of operation S130 of determining whether an angle of an edge pair is equal to or less than an angle tolerance, in the EUV mask manufacturing method in FIG. 1;

FIGS. 4A through 4E are conceptual diagrams for describing extraction of edges and edge pairs, generation of a coupling edge, and application of the edge filter and a coupling filter, in relation with operation S130 of determining whether the angle of an edge pair is equal to or less than an angle tolerance in FIG. 2;

FIGS. 7A through 7D are conceptual diagrams for describing operation S137 of determining the coupling edge by setting the coupling region in FIG. 6;

FIGS. 9A through 9C are conceptual diagrams for describing an effect of the EUV mask manufacturing method of FIG. 1 by using a maximum error ratio (MER);

DETAILED DESCRIPTION OF THE EMBODIMENTS

Figure 1:
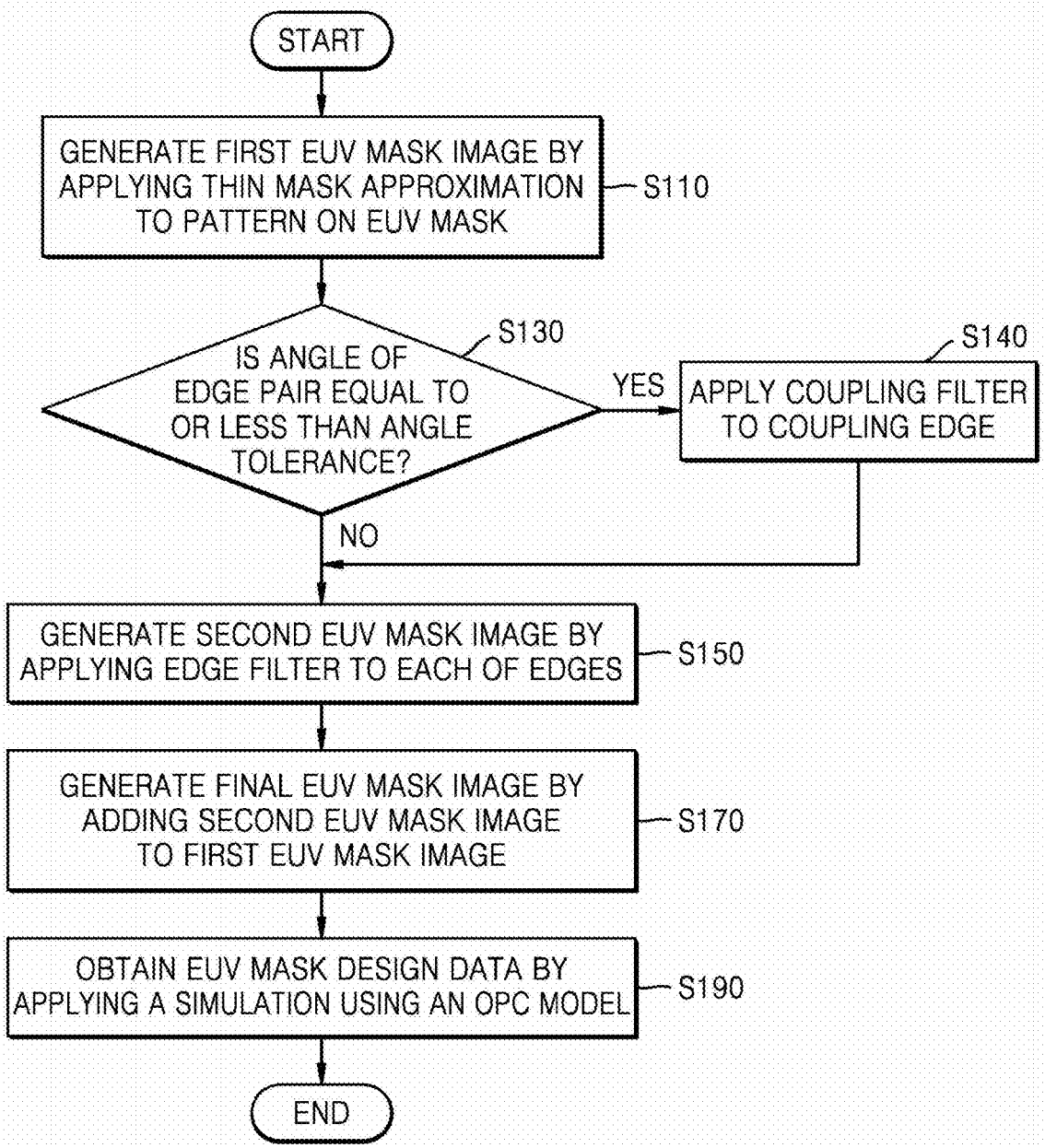
FIG. 1 is a conceptual flowchart of a process of an extreme ultraviolet (EUV) mask manufacturing method, according to an embodiment.

Hereinafter, embodiments of the inventive concept will be described in detail with reference to the accompanying drawings. Identical reference numerals are used for the same constituent elements in the drawings, and duplicate descriptions thereof are omitted.

FIG. 1 is a conceptual flowchart of a process of an extreme ultraviolet (EUV) mask manufacturing method, according to an embodiment.

Referring to FIG. 1, the EUV mask manufacturing method according to an example embodiment may first generate a first EUV mask image by applying thin mask approximation to a pattern on the EUV mask (S110). The pattern on the mask may denote a pattern that may be transferred onto a substrate such as a wafer by using an exposure process and forms a target pattern on the substrate. In this case, the exposure process may indicate an EUV exposure process by using EUV light as source light. In general, due to characteristics of the exposure process, a shape of a target pattern on the substrate may be different from a shape of a pattern on the EUV mask. In addition, because the pattern on the EUV mask is reduced, projected, and transferred onto the substrate, the pattern on the EUV mask may have a larger size than the target pattern on the substrate.

For reference, the EUV light may indicate narrowband light of about 13 nm to about 14 nm with about 13.5 nm as the center wavelength. However, the wavelength band of the EUV light is not limited thereto. For example, the EUV light may include a wide wavelength range of about 4 nm to about 124 nm. In addition, the EUV light may also include a wavelength range of less than about 11 nm. For example, the EUV light may include narrowband light of about 5 nm to about 10 nm or about 5 nm to about 8 nm, or narrowband light of about 6.5 nm to about 6.9 nm, which is called a '6.x' wavelength band.

The EUV mask may generally have a structure in which a multilayer, a capping layer, and an absorption layer are included on a mask substrate. The mask substrate may include a low thermal expansion material (LTEM). For example, the mask substrate may include silicon, quartz, etc. The multilayer may include, for example, a plurality of silicon layers and molybdenum layers, which are alternately stacked on the mask substrate. The capping layer may be formed on the multilayer, and may include, for example, ruthenium (Ru).

The absorption layer may be formed on the capping layer, and may include an absorption body and an anti-reflective coating (ARC) layer. The absorption body may include a layer absorbing the EUV light, and may include TaBN, TaN, Ta, TiN, Ti, Lr, etc. However, a material of the absorption body is not limited to the materials described above. The absorption layer may constitute a pattern on the EUV mask, and a pattern required on a wafer may be formed by transferring the pattern of the absorption layer to the wafer via the exposure process.

The ARC layer may be formed on the absorption layer and prevent reflection of incident EUV light, and according to an embodiment, may be omitted.

A layout of the pattern on the EUV mask may have a one-dimensional (1D) or two-dimensional (2D) shape. In this case, the 1D shape may denote not a line having no area but a shape extending in one direction such as a line & space pattern, and the 2D shape may denote a particular shape such as a circle or a polygon. The layout of the pattern on the EUV mask may be defined by edges, and the edges may correspond to straight lines surrounding a periphery of the layout of the pattern. According to an embodiment, the edges may denote straight lines surrounding a space between the layouts of the pattern, or both of the straight lines surrounding the space and the straight lines surrounding the layout of the pattern. In relation with extraction of the edges, more detailed description will be given with reference to FIGS. 4A through 4E.

The thin mask approximation applied to the pattern on the EUV mask may be referred to as Kirchhoff approximation, and may denote a calculated near field image, by assuming that a thickness of a mask is as small as null, and light completely penetrates an open portion and is completely blocked at a closed portion. On the other hand, because the EUV mask is of a reflection type, it may be assumed that light is completely reflected by a reflection region and completely absorbed by an absorption region in the thin mask approximation. In relation with the thin mask approximation, more detailed descriptions will be given with reference to FIGS. 3A through 3E.

Thereafter, whether an angle of an edge pair is greater than an angle tolerance or is equal to or less than the angle tolerance may be determined (S130). In this case, the edge pair may denote two edges facing each other of edges for the layout of the pattern described above. Two edges constituting the edge pair, for example, a first edge (refer to E1 in FIG. 7A) and a second edge (refer to E2 in FIG. 7B), may be parallel with each other, or may have a certain angle without being parallel with each other. In this case, the angle of the edge pair denoting an angle between the first edge E1 and the second edge E2 may be defined as a difference between an angle of the first edge E1 and an angle of the second edge E2 with respect to a reference line. For example, when the first edge E1 has a first angle θ1 with respect to the reference line, and the second edge E2 has a second angle θ2 with respect to the reference line, the angle of the edge pair may be defined as |θ1−θ2|.

The angle tolerance may be an angle at which two edges forming the edge pair affect each other, and may be, for example, about 20°. In other words, when the angle of the edge pair is equal to or less than about 20°, two edges forming the edge pair may affect each other, and when the angle of the edge pair exceeds about 20°, two edges forming the edge pair may not affect each other. However, the angle tolerance is not limited to about 20°. For example, the angle tolerance may be variously set according to a pattern shape or a distance between facing edges.

When the angle of the edge pair is equal to or less than the angle tolerance (Yes), the coupling filter may be applied to the coupling edge (S140). In relation with a principle in which the coupling filter is applied to the coupling edge, more detailed description will be given with reference to FIGS. 4A through 4E for the case where two edges of the edge pair are parallel with each other, and with reference to FIGS. 6 through 7D for the case where two edges of the edge pair are not parallel with each other.

When the angle of the edge pair exceeds the angle tolerance (No), a second EUV mask image may be generated by applying the edge filter to each of the edges (S150). More detailed descriptions of a process of generating the second EUV mask image by applying the edge filter to each of the edges will be given with reference to FIGS. 3A through 3E.

An operation of generating the second EUV mask image (S150) may proceed without performing operation S140 of applying the coupling filter to the coupling edge when the angle of the edge pair exceeds the angle tolerance (No). Also, an operation of generating the second EUV mask image (S150) may proceed after performing operation S140 of applying the coupling filter to the coupling edge when the angle of the edge pair is equal to or less than the angle tolerance (Yes) (i.e., the sequence of operations may be S140, S150, S170). According to an embodiment, an application sequence of the edge filter and the coupling filter may be reversed. For example, operation S150 of generating the second EUV mask image may be performed first regardless of whether the angle of the edge pair is equal to or less than the angle tolerance, and thereafter, when the angle of the edge pair is equal to or less than the angle tolerance (Yes), operation S140 of applying the coupling filter to the coupling edge may be performed, and then, a subsequent operation, operation S170 of generating the final EUV mask, may proceed (i.e., the sequence of operations may be S150, S140, S170). In addition, when the angle of the edge pair exceeds the angle tolerance (No), operation S140 of applying the coupling filter to the coupling edge may not be performed, but operation S170 of generating the first EUV mask image may immediately proceed (i.e., the sequence of operations may be S150, S170).

After operation S150 of generating the second EUV mask image, the final EUV mask image may be generated by adding the second EUV mask image to the first EUV mask image (S170). The final EUV mask image may be, in the end, a final EUV mask image for the pattern on the EUV mask, and in addition, may correspond to a rigorous EUV mask image obtained by using an electromagnetic field simulation. The electromagnetic field simulation may include, for example, a rigorous coupled-wave analysis (RCWA) simulation or a finite difference time domain (FDTD) simulation. Descriptions of the rigorous EUV mask image will be given with reference to FIGS. 3A through 3E.

Thereafter, design data for the EUV mask may be obtained by employing a simulation using an optical proximity correction (OPC) model. The OPC model may be generated based on a previously obtained EUV mask image. In this case, the OPC model may denote a simulation model used in the OPC method. More detailed descriptions of the OPC method will be given. The OPC method may be a method of correcting the layout of the pattern to overcome an optical proximity effect (OPE) that occurs during the exposure process due to effects between adjacent patterns as patterns become finer, and suppressing the occurrence of the OPE. The OPC method may be divided into two types: one is a rule-based OPC method and the other is a simulation-based or model-based OPC method. In the EUV mask manufacturing method according to the embodiment, for example, the model-based OPC method may be used. The model-based OPC method may be good in terms of time and cost because measurement results of only representative patterns are used without needing to measure all of a plurality of test patterns.

On the other hand, the OPC method may include a method of adding not only a modification of the layout of the pattern but also sub-lithographic features called serifs at corners of the pattern, or may include a method of adding sub-resolution assist features (SRAF) such as scattering bars. In this case, the serif may be rectangular features that are generally located at each corner of the pattern, and may be used to sharpen the corners of the pattern or to compensate for a distortion factor caused by intersection of the patterns. The SRAF may be a supplementary feature used to solve an OPC deviation issue caused by a density difference of the pattern, and may be a feature that is formed in a size smaller than a resolution of an exposure apparatus and not transferred to a resist layer.

A brief description of an execution of the OPC method will be given. First, basic data for the OPC method may be prepared. In this case, the basic data may include data on a shape of the patterns of a sample, locations of the patterns, a type of measurement such as measurement of a space and measurement of a line of the pattern, a basic measurement value, etc. In addition, the basic data may include information about thickness, refractive index, dielectric constant, or the like for Photo-Resist (PR), and may include a source map for a type of an illumination system. However, the basic data is not limited to the data described above.

After the basic data is prepared, an optical OPC model may be generated. The generation of the optical OPC model may include optimization of a defocus stand (DS) position, a best focus (BF) position, and the like in the exposure process. In addition, the generation of the optical OPC model may include generation of the mask image considering the diffraction phenomenon of light, an optical state of the exposure apparatus itself, etc. The final EUV mask image previously obtained by adding the first EUV mask image to the second EUV mask image may be used for generating the optical OPC model. Factors included in the generation of the optical OPC model are not limited thereto. For example, the generation of the optical OPC model may include various factors related to the optical phenomenon in the exposure process.

After generating the optical OPC model, an OPC model for Photo-Resist (PR) may be generated. The generation of the OPC model for the PR may include optimization of a threshold of the PR. In this case, the threshold of the PR may denote a threshold at which a chemical change occurs in the exposure process, and the threshold may be provided as, for example, the intensity of exposure light. The generation of the OPC model for the PR may also include selecting a proper model form from various PR model forms.

Both the optical OPC model and the OPC model for the PR may be collectively referred to as OPC models. Thus, both a process of generating the optical OPC model and a process of generating the OPC model for the PR may be collectively referred to as a process of generating the OPC model, that is, an OPC modeling process. Hereinafter, unless otherwise particularly noted, the OPC model may be used as a concept for a combination of the optical OPC model and the OPC model for the PR.

After the OPC model is generated, the OPC model may be verified. The verification of the OPC model may be performed by a root mean square (RMS) calculation for a critical dimension (CD) error, an edge placement error (EPE) check, etc. When the OPC model is included in a certain specification, the verification of the OPC model may be completed, and the corresponding OPC model may be selected as the OPC model for the simulation. When the OPC model is not included in the certain specification, the process of generating the OPC model, that is, the process of generating the optical OPC model and/or the process of generating the OPC model for the PR, may be performed again.

After the OPC model is verified, the simulation may be performed by using the corresponding OPC model. By using the simulation using the corresponding OPC model, the design data of the mask that is close to an actual measurement may be obtained. A process of generating an OPC model and obtaining design data for a mask by utilizing simulation using the OPC model in this manner may be referred to as an OPC method.

The EUV mask manufacturing method according to the embodiment may further include processes of transferring, to a mask manufacturing team, the design data for the EUV mask obtained by using the OPC method as mask tape-out (MTO) design data for mask manufacturing, of preparing mask data, and of exposing the EUV mask substrate. On this matter, more detailed descriptions will be given with reference to FIG. 11.

The EUV mask manufacturing method according to the embodiment may apply the coupling filter to the coupling edge, and when the angle of the edge pair is not about 0°, that is, when the edges constituting the edge pair are not parallel with each other, may also include a method of applying the coupling filter. Accordingly, even when the pattern of the EUV mask includes a curvilinear shape, by applying the coupling filter corresponding thereto, the EUV mask image may be generated by efficiently reflecting the mask topography effect or a coupling effect between the edges. As a result, the EUV mask manufacturing method according to the embodiment may manufacture the EUV mask capable of forming an optimum pattern on the wafer, by improving the accuracy of the EUV mask image.

FIG. 2 is a more detailed flowchart of operation S130 of determining whether an angle of an edge pair is greater than an angle tolerance or is equal to or less than the angle tolerance, in the EUV mask manufacturing method of FIG. 1. Descriptions already given with reference to FIG. 1 will be briefly described or omitted.

Referring to FIG. 2, in operation S130 of determining whether the angle of the edge pair is greater than the angle tolerance or is equal to or less than the angle tolerance, first, two edges facing each other may be extracted as an edge pair (S131). In this case, the edges may denote edges of the layout of the pattern of the EUV mask. In addition, the "two edges facing each other" may denote two edges that meet each other face to face, and may include not only two edges parallel with each other but two edges meeting each other face to face with a certain angle therebetween.

Next, whether the angle of the edge pair belongs to a first case or a second case may be determined (S133). The first case may denote a case where the angle of the edge pair is about 0°, for example, a case where two edges of the edge pair are parallel with each other. The second case may denote a case where the angle of the edge pair is greater than about 0°, and equal to or less than the set angle tolerance. For example, the angle tolerance may be about 20°. However, the angle tolerance is not limited to about 20°. Terms such as "about" or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

In the first case ①, it is determined whether a distance of the edge pair is equal to or less than a set reference distance (S135). In this case, the distance of the edge pair may denote a distance between two edges of the edge pair, and a reference distance may be determined by a distance at which the coupling effect occurs. For example, the reference distance may have a range of about 20 nm to about 30 nm. However, the reference distance is not limited to the number range described above.

When the distance of the edge pair is equal to or less than the reference distance (Yes), the coupling edge may be determined based on a centerline between a first edge and a second edge, which are two edges of the edge pair (S139). When the coupling edge is determined, the coupling filter may be applied to the coupling edge (S140). In relation with the first case ①, the process of determining a coupling edge and applying the coupling filter to the coupling edge will be described in more detail with reference to FIGS. 4A through 4E.

On the other hand, when the distance of the edge pair exceeds the reference distance (No), the second EUV mask image may be generated (S150).

In operation S133 of determining whether the angle of the edge pair belongs to the first case or the second case, when the case is the second case ②, the coupling edge may be determined based on a coupling region defined as a region between the first edge and the second edge, which are two edges of the edge pair (S137). When the coupling edge is determined, the coupling filter may also be applied to the coupling edge (S140). In relation with the second case, a method of determining the coupling edge by setting the coupling region will be described in more detail with reference to FIGS. 6 through 7D.

FIGS. 3A through 3E are conceptual diagrams for describing an edge filter and a principle of generating the first EUV mask image by using the edge filter, in relation with operation S110 of generating the first EUV mask image, in the EUV mask manufacturing method of FIG. 1. Duplicate descriptions already given with reference to FIGS. 1 and 2 are briefly described or omitted.

Figure 3A:
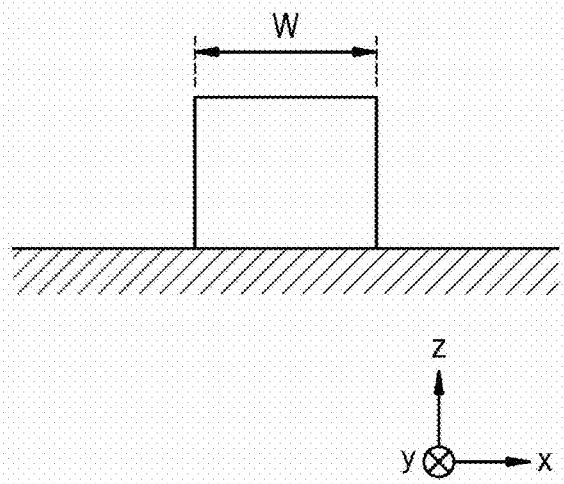
FIGS. 3A through 3E are conceptual diagrams for describing an edge filter and a principle of generating a first EUV mask image by using the edge filter, in relation with operation S110 of generating the first EUV mask image, in the EUV mask manufacturing method of FIG. 1.

Referring to FIG. 3A, FIG. 3A illustrates a vertical cross-section of a line pattern of a 1D shape as a shape of a pattern formed on a wafer by using a mask. The line pattern may have a certain width W in a first direction (x direction), and extend in a direction perpendicular to an x-z plane, that is, a second direction (y direction).

Figure 3B:
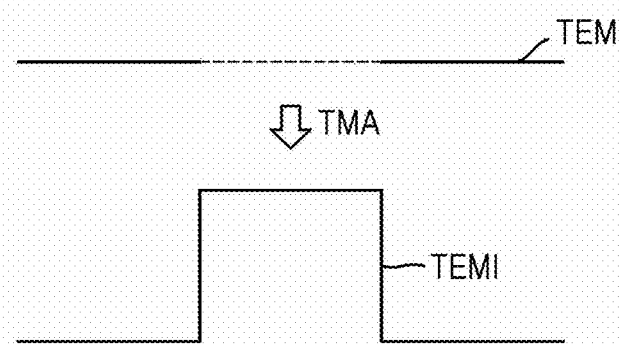

Referring to FIG. 3B, to form the pattern illustrated in FIG. 3A, an EUV mask image for the case of using an ideal thin EUV mask TEM is illustrated. For example, FIG. 3B illustrates an EUV mask image obtained by using a thin mask approximation TMA (hereinafter, referred to as a 'thin EUV mask image' TEMI). In this case, the ideal thin EUV mask TEM may include an EUV mask having almost null thickness, and may denote an EUV mask in which light is completely reflected in a dashed line portion that is a reflection region, and light is completely absorbed in a solid line portion that is an absorption region. As illustrated, the thin EUV mask image TEMI may have a shape almost similar to a shape of a pattern to be formed on a wafer.

Figure 3C:
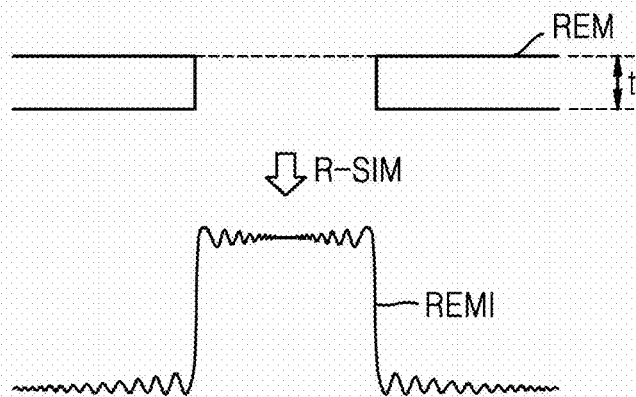

Referring to FIG. 3C, a real EUV mask REM used for forming the pattern is illustrated. The real EUV mask REM may have a certain thickness t, and accordingly, the EUV mask image generated by reflection from the real EUV mask REM may be different from the thin EUV mask image TEMI. In addition, in FIG. 3C, the mask substrate and a multilayer portion are omitted, and only an absorption layer portion constituting the pattern is illustrated. In addition, the EUV mask image, calculated by using a rigorous simulation such as the RCWA and FDTD simulation, or a rigorous EUV mask image REMI, is illustrated under the real EUV mask REM.

Figure 3D:
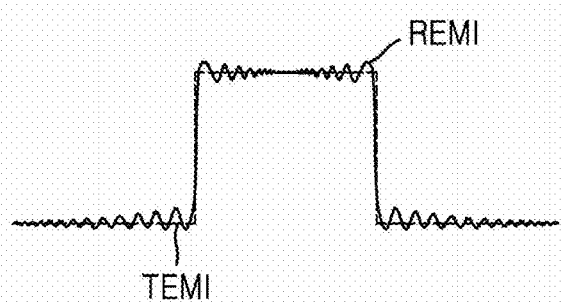

Referring to FIG. 3D, the rigorous EUV mask image REMI is depicted as a solid line, and the thin EUV mask image TEMI is depicted as a dashed line. As illustrated in FIG. 3D, the rigorous EUV mask image REMI may be different from the thin EUV mask image TEMI, and in particular, the rigorous EUV mask image REMI may be significantly different from the thin EUV mask image TEMI at edge portions of the pattern. In other words, at portions away from the edges of the pattern, the rigorous EUV mask image REMI may be substantially the same as the thin EUV mask image TEMI.

Figure 3E:
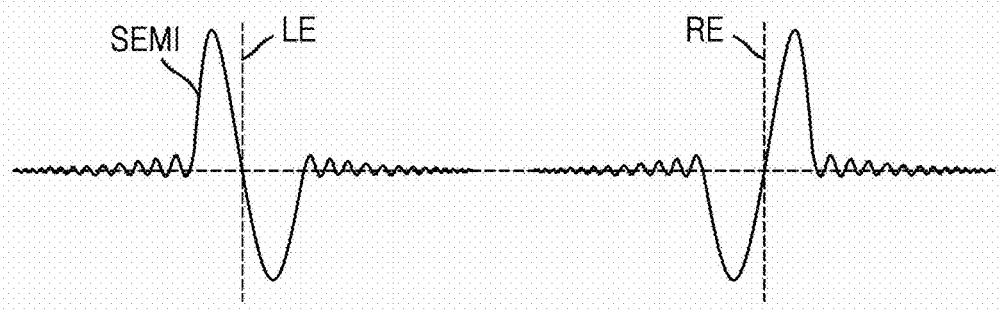

Referring to FIG. 3E, a shape of a subtracted EUV mask image SEMI that is obtained by subtracting the thin EUV mask image TEMI from the rigorous EUV mask image REMI is illustrated. As described above, a change in amplitude of the subtracted EUV mask image SEMI at portions adjacent to a left edge LE and a right edge RE may be increased, and a change in amplitude of the subtracted EUV mask image SEMI at portions farther away from the left edge LE and the right edge RE may be decreased.

On the other hand, in FIG. 3E, the subtracted EUV mask image SEMI is illustrated after somewhat expanding a scale of the amplitude thereof compared to the rigorous EUV mask image REMI and the thin EUV mask image TEMI. In addition, in FIG. 3E, the subtracted EUV mask image SEMI on the left edge LE portion and the subtracted EUV mask image SEMI on the right edge RE portion are illustrated in an identical shape and symmetrical to each other. However, due to slanted incidence of light, the subtracted EUV mask image SEMI on the left edge LE portion and the subtracted EUV mask image SEMI on the right edge RE portion may have different shapes from each other.

The subtracted EUV mask images SEMI on the left and right edge portions may correspond to the edge filters. Accordingly, the edges may be extracted from the layout of the pattern, and by applying the edge filters corresponding to the edges, the subtracted EUV mask image SEMI, that is, the second EUV mask image, may be generated. Thereafter, when the thin EUV mask image TEMI, that is, the first EUV mask image, is added to the second EUV mask image, the final EUV mask image that is substantially the same as the rigorous EUV mask image REMI may be generated.

In general, when the coupling effect between adjacent edges is negligibly small due to a large width of the pattern, the EUV mask image may be generated quickly and relatively accurately by using a method of applying the edge filter. However, when the coupling effect between the adjacent edges increases due to a decreasing width of the pattern, an error in the mask image obtained by using the method of applying the edge filter may occur. Accordingly, in the case of a pattern with a narrow width, as described below with reference to FIGS. 4A through 4E, the coupling filter may be additionally applied to remove an error due to the coupling effect.

FIGS. 4A through 4E are conceptual diagrams for describing extraction of the edges and the edge pairs, generation of the coupling edge, and application of the edge filter and the coupling filter, in relation with operation S130 of determining whether the angle of the edge pair is equal to or less than the angle tolerance in FIG. 2. Duplicate descriptions already given with reference to FIGS. 1 through 3E are briefly described or omitted.

Figure 4C:
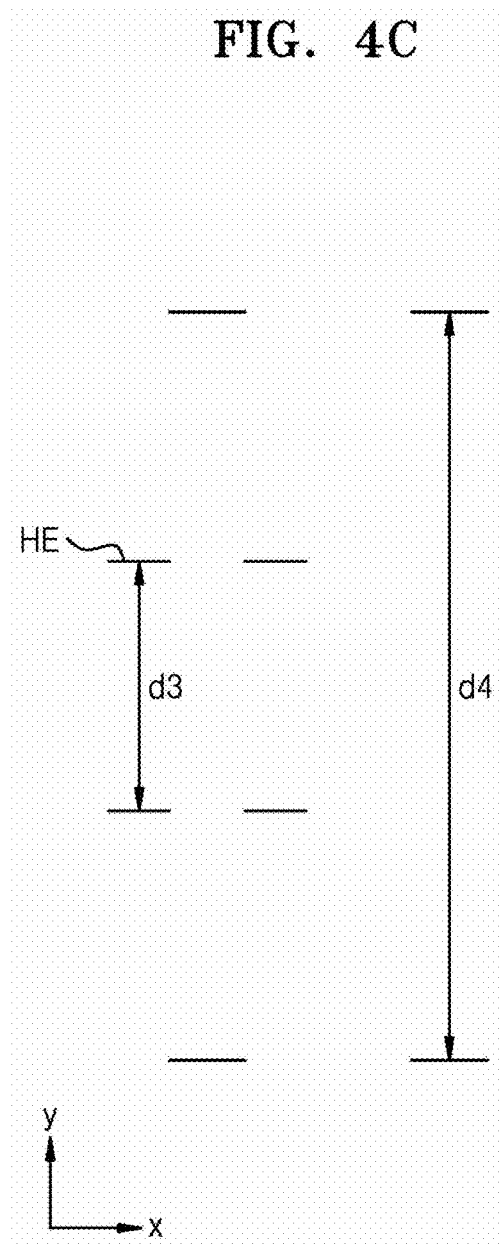

Referring to FIGS. 4A through 4C, FIG. 4A illustrates a layout of a pattern on the EUV mask, FIG. 4B illustrates extracted vertical edges VE extending in a vertical direction, that is, the second direction (y direction) of the edges surrounding the layout of the pattern, and FIG. 4C illustrates extracted horizontal edges HE extending in the horizontal direction, that is, the first direction (y direction) of the edges surrounding the layout of the pattern.

As illustrated in FIG. 4A, the layout of the pattern may be surrounded by edges extending in the first direction (x direction) and the second direction (y direction). Accordingly, the two edges constituting the edge pair and facing each other may be parallel with each other, and the angle of the edge pair may be defined as about 0°. In addition, as illustrated in FIGS. 4B and 4C, the distance of the edge pair constituted by parallel edges may be directly calculated via a line perpendicular to the edges. For example, in FIGS. 4B and 4C, distances of the edge pairs are illustrated as a first distance d1, a second distance d2, a third distance d3, a fourth distance d4, etc.

Referring to FIG. 4D, of the edges extracted from the layout of the pattern, an edge pair satisfying a set reference may be extracted as the coupling edge pair. For example, the reference for extracting the coupling edge pair may include a distance of the edge pair. When the distance of the edge pair is equal to or less than a reference distance, the corresponding edge pair may be determined as the coupling edge pair. In this case, the reference distance may have a range of about 20 nm to about 30 nm. However, the reference distance is not limited to the number range described above.

In FIGS. 4B and 4C, when the first distance d1 is equal to or less than the reference distance, and the second distance d2, the third distance d3, and the fourth distance d4 exceed the reference distance, as illustrated in FIG. 4D, three coupling edge pairs may be extracted. In addition, from an aspect of the coupling effect, inner portions (hatched portions) of the extracted coupling edge pairs may correspond to coupling regions where the coupling effect is large.

On the other hand, even though it has been described that the coupling edge pair is extracted from the edges surrounding the layout of the pattern, the embodiment is not limited thereto, and the coupling edge pair may be extracted from the edges surrounding the spaces between the layouts of the pattern. For example, when the space interval between the patterns is narrow and the distance between the adjacent edges surrounding the space is equal to or less than the set reference distance, the coupling edge pair may be extracted from the edges surrounding the space.

After the coupling edge pairs are extracted from the edges of the layout of the pattern, the center line of the two edges of each of the coupling edge pairs may be set as a coupling edge CE. In FIG. 4D, the coupling edge CE is illustrated as a dash-dot line. The coupling edge CE may be denoted as an edge to which the coupling filter is applied. The principle of generating the coupling filter will be described in more detail with reference to FIGS. 5A through 5D.

Referring to FIG. 4E, after the coupling edge CE is generated, the second EUV mask image may be generated by applying the edge filter to the edge and applying the coupling filter to the coupling edge CE. In descriptions given with reference to FIGS. 3A through 3E, a method of generating the second EUV mask image by applying the edge filter to the edge has been described, but in FIG. 4E, the second EUV mask image may be generated by additionally applying the coupling filter to the coupling edge CE.

This process may correspond to a concept of correcting for the second EUV mask image, which has been obtained by applying the edge filter to the edge, by applying the coupling filter to the coupling edge CE. The order of application of the edge filter and the coupling filter may be arbitrary. For example, after the edge filter is applied to the edge, the coupling filter may be applied to the coupling edge CE, but to the contrary, even after the coupling filter is applied to the coupling edge CE, the edge filter may be applied to the edge. In addition, both the edge filter and the coupling filter may be simultaneously applied.

On the other hand, in FIG. 4E, the edge filter and the coupling filter are illustrated as simplified wave forms. The edge filter is represented by a thin dashed line of a small size, and the coupling filter is represented by a thick dashed line of a large size. The coupling filter may be applied to the coupling edge CE generated in the coupling region (hatched region) to which the coupling effect is applied. In addition, depending on shapes and widths of the coupling edge pairs, the shapes of the coupling filters corresponding thereto may be different from each other.

In FIG. 4E, the edge filters are illustrated as identical shapes to each other, but detailed shapes of the edge filters may be different from each other. For example, even the edges surrounding the same pattern of the near field images on an edge on the left side and an edge on the right side may have different calculation results from each other. This difference may be due to a fact that light is incident at a slant angle with respect to the pattern in the EUV exposure process. Accordingly, the shapes of the edge filters applied to the edges on the left and right sides may be different from each other due to the slanted incidence of light.

Figure 5A:
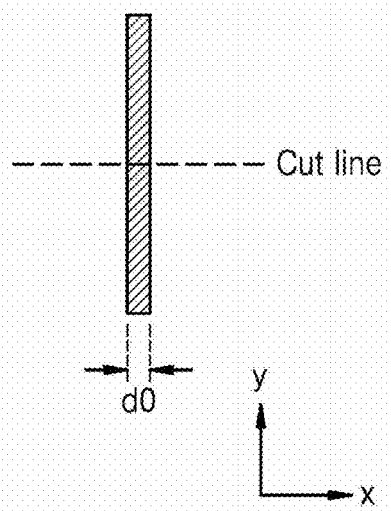
FIGS. 5A through 5D are conceptual diagrams for describing a principle of generating the coupling filter for the coupling edge and a principle of generating a second EUV mask image by using the coupling filter, in relation with the edge filter and the coupling filter in FIG. 4E.
Figure 5B:
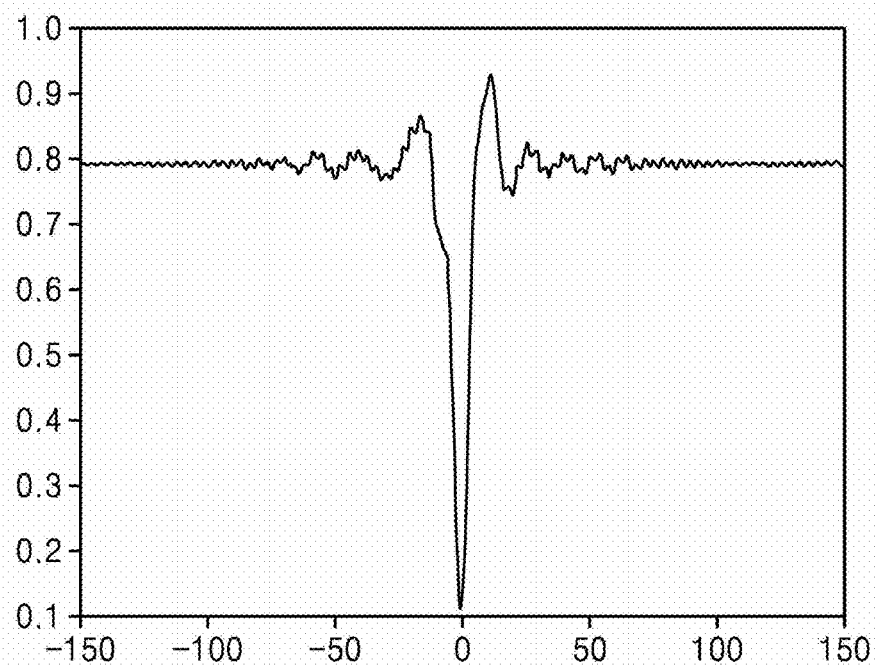
Figure 5C:
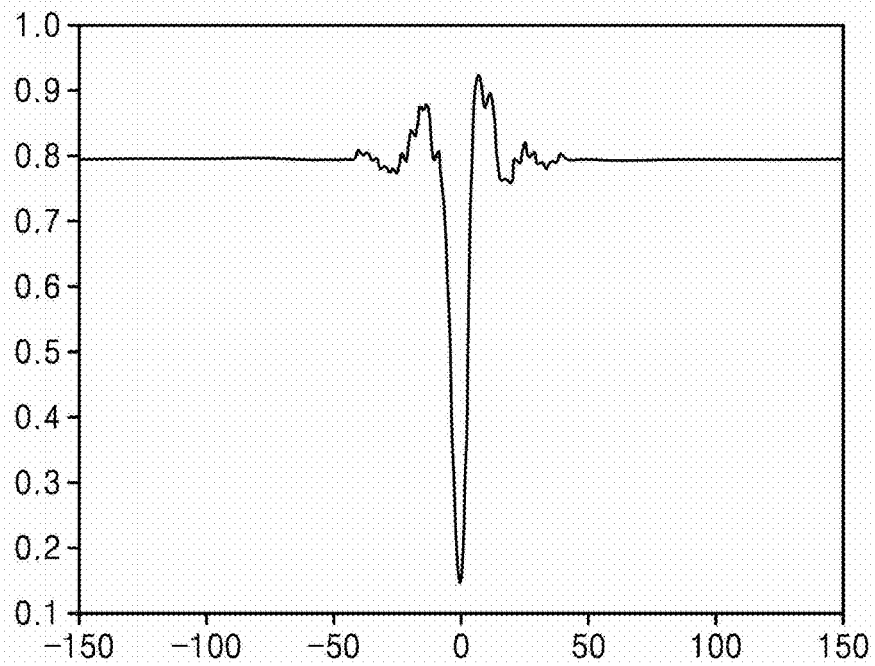
Figure 5D:
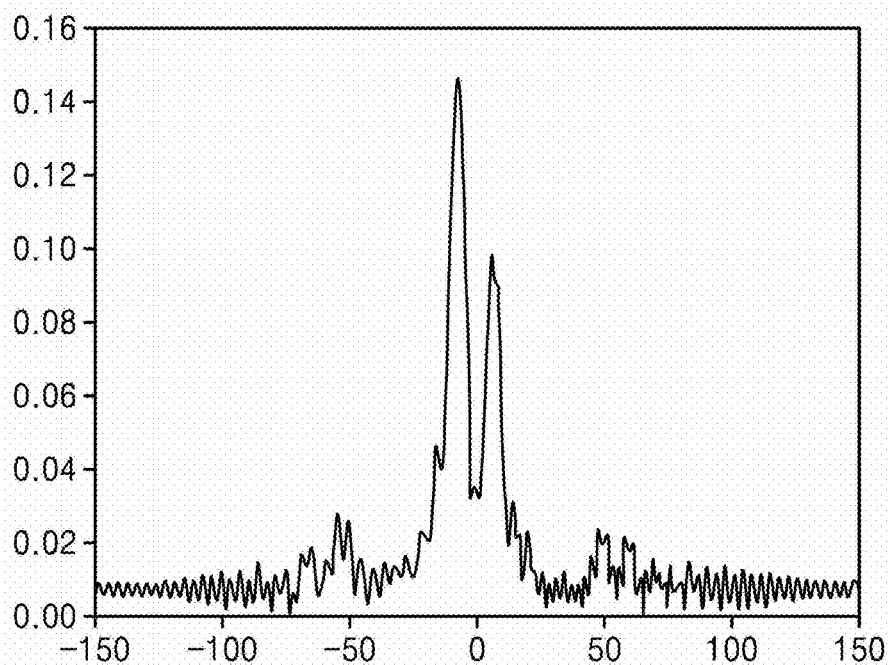

FIGS. 5A through 5D are conceptual diagrams for describing a principle of generating the coupling filter for the coupling edge and a principle of generating a second EUV mask image by using the coupling filter, in relation with the edge filter and the coupling filter in FIG. 4E. In the graphs of FIGS. 5B and 5D, the x axis may be a position in the first direction (x direction) corresponding to the layout of the pattern in FIG. 5A in units of nm, and the y axis may represent amplitude of the near field in an arbitrary unit.

Referring to FIG. 5A, the layout of the pattern on the EUV mask is illustrated, and the layout of the pattern may have a 1D line shape. The layout of the pattern may have a line shape, and a reference width d0 in the first direction (x direction). For example, the reference width d0 may be about 10 nm. Accordingly, the distance of the edge pair extracted from the layout of the pattern of a line shape of FIG. 5A may be about 10 nm. When, as in a previous case, a reference of extracting the coupling edge pair is that the distance of the edge pair is equal to or less than the reference distance and the reference distance is in a range of about 20 nm to about 30 nm, the edge pair extracted from the layout of the pattern of a line shape in FIG. 5A may correspond to the coupling edge pair. In addition, the coupling effect between the edges may be large. On the other hand, a dashed line or a broken line extending in the first direction (x direction) at the central portion of the layout of the pattern in the second direction (y direction) may correspond to portions where the EUV mask images in FIGS. 5B and 5C are calculated.

Referring to FIG. 5B, FIG. 5B illustrates the EUV mask image, that is, the rigorous EUV mask image REMI that is obtained by applying the rigorous simulation on the layout of the pattern of a line shape of FIG. 5A. As illustrated by the graph in FIG. 5B, a change in amplitude of the near field may be large at portions corresponding to the layout of the pattern. In addition, as the change in amplitude of the near field is farther from both sides of the layout of the pattern, the change in amplitude of the near field may be small.

Referring to FIG. 5C, FIG. 5C illustrates the final EUV mask image in which the second EUV mask image is added to the first EUV mask image. After the first EUV mask image is obtained by using the thin mask approximation on the layout of the pattern of a line shape of FIG. 5A, and in addition, the edges on both sides are extracted from the layout of the pattern of a line shape of FIG. 5A, the second EUV mask image may be obtained by applying the edge filter to the edges on both sides. Thereafter, the final EUV mask image may be generated by adding the second EUV mask image to the first EUV mask image.

The final EUV mask image may include the second EUV mask image to which the edge filter has been used, and thus, a change in amplitude of the near field may be large at portions corresponding to the pattern, and in addition, a change in amplitude of the near field may be almost null when a location is farther toward the periphery in the line pattern. As described above, when the width of the pattern is small, the coupling effect between the extracted edges may be large, and accordingly, the second EUV mask image obtained by using the edge filter and the final EUV mask image corresponding thereto may be different from the rigorous EUV mask image. The difference between the rigorous EUV mask image and the final EUV mask image may correspond to an error of the final EUV mask image.

Referring to FIG. 5D, FIG. 5D illustrates the subtracted EUV mask image in which the final EUV mask image of FIG. 5C is subtracted from the rigorous EUV mask image REMI of FIG. 5B. The subtracted EUV mask image may have a large change in amplitude at portions corresponding to the pattern, and may have a small change in amplitude at portions farther away from the pattern. On the other hand, the subtracted EUV mask image of FIG. 5D illustrates a more enlarged scale of amplitude, compared to the rigorous EUV mask image REMI of FIG. 5B and the final EUV mask image of FIG. 5C.

In the EUV mask manufacturing method according to the embodiment, the subtracted EUV mask image in which the final EUV mask image of FIG. 5C is subtracted from the rigorous EUV mask image REMI of FIG. 5B may correspond to the coupling filter. By applying the coupling filter to a coupling edge pair having the large coupling effect, errors of the second EUV mask image obtained by using only the edge filter and the final EUV mask image corresponding thereto may be corrected. The definition of the coupling filter and the correction effect thereby is briefly described by formulas as the following.

The final EUV mask image FEMI may be obtained by adding the thin EUV mask image TEMI obtained by using the thin mask approximation, that is, the first EUV mask image, to an edge EUV mask image EEMI obtained by applying the edge filter, that is the second EUV mask image. Accordingly, the final EUV mask image FEMI may be expressed as Formula 1.

$$FEMI=EEMI+TEMI \qquad \text{Formula 1}$$

In this case, the final EUV mask image FEMI may include the edge EUV mask image EEMI that is obtained by applying the edge filter to all edges. For example, in the case of the pattern of a line shape, after obtaining the edge EUV mask image EEMI by applying the edge filter corresponding to all of edges on the left and right sides and edges on upper and lower sides, by adding the thin EUV mask image TEMI obtained by applying the thin mask approximation to the edge EUV mask image EEMI, the final EUV mask image FEMI may be obtained.

Next, a coupling EUV mask image CEMI obtained by applying the coupling filter may be expressed as Formula 2, in relation with the rigorous EUV mask image REMI obtained by using the rigorous simulation.

$$CEMI=RETI-FEMI=RETI-EEMI-TEMI \qquad \text{Formula 2}$$

Then, by adding the coupling EUV mask image CEMI obtained by using the coupling filter to the final EUV mask image FEMI, a corrected final EUV mask image CFEMI may be obtained. The corrected final EUV mask image CFEMI may be expressed as Formula 3.

$$CFEMI=FEMI(EEMI+TEMI)+CEMI(RETI-EEMI-TEMI)=RETI \qquad \text{Formula 3}$$

As a result, the corrected final EUV mask image CFEMI may be substantially the same as the rigorous EUV mask image REMI obtained by using the rigorous simulation on the corresponding pattern. Thus, it may be expected that the corrected final EUV mask image CFEMI may accurately represent the EUV mask including the corresponding pattern. On the other hand, as described in the generation process of the coupling filter, only one coupling filter may be required to be applied to the edge pair, and it may not be required to apply the coupling filter to each edge. For example, in the case of the pattern of a line shape, only one coupling filter may need to be generated and applied.

In the EUV mask manufacturing method according to the embodiment, in a manner of correcting the second EUV mask image, obtained by using the edge filter, by using the coupling filter, the EUV mask image may be generated. A method in this manner may have the following advantages. First, a method using a general edge filter may be used as is. Accordingly, the EUV mask image may be quickly calculated by using a simulation for obtaining the general EUV mask image without a change in the simulation. Second, because the coupling effect between the adjacent patterns is reflected in the edge filter and the coupling filter, other adjacent patterns may not need to be considered.

In general, the coupling filter may be prepared in advance according to the distance between the edges by using the method described above, and stored in a filter library, and when an application of the coupling filter is required, the coupling filter may be used after being fetched from the filter library according to the distance of the edge pair. For example, in a pattern having a Manhattan shape, edges parallel with each other may be extracted by using polygon decomposition, and the second EUV mask image may be easily and quickly generated by applying the coupling filter according to a distance between the edges constituting the edge pair.

On the other hand, in a pattern having a curvilinear shape, edges not parallel with each other may be extracted by using polygon decomposition, and accordingly, because the edges constituting the edge pair are not parallel with each other, there may be an issue that it is difficult to apply the coupling filter. Accordingly, for the pattern having a curvilinear shape, the second EUV mask image may be generated by applying only the edge filter without applying the coupling filter, or the EUV mask image may be generated by the rigorous simulation. However, when only the edge filter is used, an error may occur because the coupling effect is not reflected, and when the rigorous simulation is used, there may be an issue that a lot of time is required. To solve the issues described above, the EUV mask manufacturing method according to the embodiment may include a method of applying the coupling filter to an edge pair in which edges are not parallel with each other. Hereinafter, more detailed descriptions will be given with respect to a method of applying the coupling filter to the edge pair in which the edges are not parallel with each other.

Figure 6:
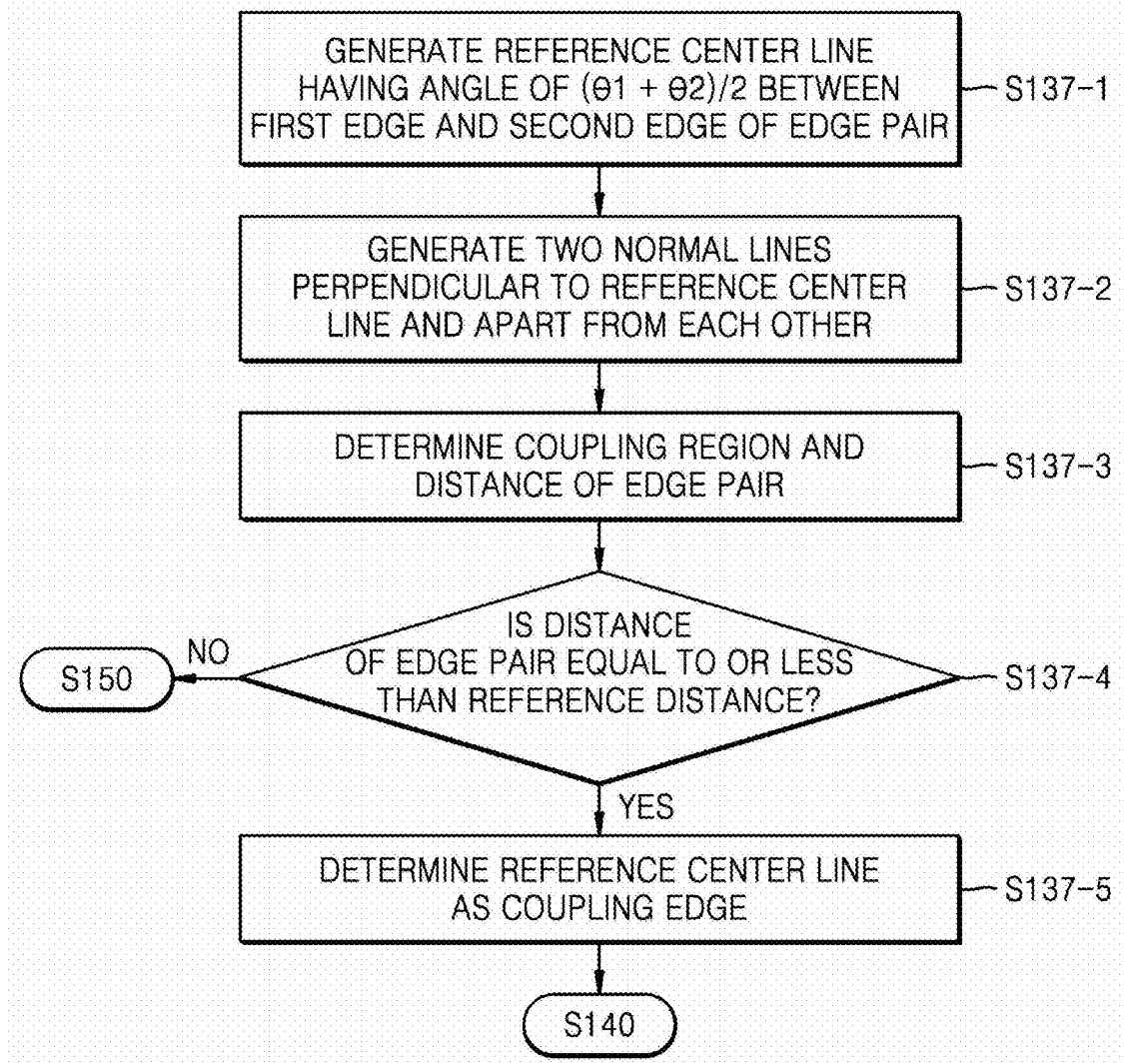
FIG. 6 is a more detailed flowchart of operation S137 of determining the coupling edge by setting a coupling region, in relation with a second case of operation S133 of determining whether the angle of the edge pair in FIG. 2 is a first case or a second case.

FIG. 6 is a more detailed flowchart of operation S137 of determining the coupling edge based on the coupling region, in relation with the second case ②, in operation S133 of determining whether the angle of the edge pair is the first case or the second case in FIG. 2, and FIGS. 7A through 7D are conceptual diagrams of operation S137 of determining the coupling edge based on the coupling region in FIG. 6.

Referring to FIG. 7A, FIG. 7A illustrates a case where the angle of the edge pair is the second case ②, that is, when the angle of the edge pair is greater than about 0° and equal to or less than the angle tolerance. The first edge E1 and the second edge E2 forming the edge pair may have a first angle $\theta1$ and a second angle $\theta2$ with respect to the reference line (dashed line), respectively. In addition, the angle of the edge pair may be defined as $|\theta1-\theta2|$, and the second case may correspond to '$0<|\theta1-\theta2|\leq$angle tolerance'. In this case, the angle tolerance may be, for example, about 20°. However, the angle tolerance is not limited thereto.

Referring to FIGS. 6 and 7B, reference center line CL having an angle of $(\theta1+\theta2)/2$ with respect to the reference line (dashed line) between the first edge E1 and the second edge E2 of the edge pair may be generated (S137-1). The reference center line CL has an angle of $(\theta1+\theta2)/2$ and may be arranged at any location between the first edge E1 and the second edge E2. Accordingly, as illustrated in FIG. 7B, the reference center line CL may be generated approximately at the center location between the first edge E1 and the second edge E2.

Figure 7C:
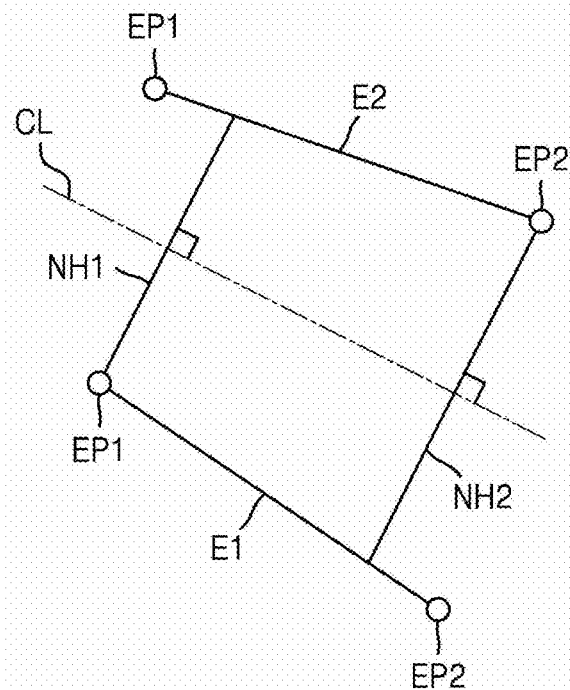

Referring to FIGS. 6 and 7C, after the reference center line CL is generated, two normal lines NH1 and NH2, which are perpendicular to the reference center line CL and apart from each other, may be generated (S137-2). The two normal lines NH1 and NH2 may be generated as follows. First, when the first edge E1 and the second edge E2 have straight lines connecting a first end point EP1 to a second end point EP2, and a first end point EP1 to a second end point EP2, respectively, a first normal line NH1 may, as illustrated in FIG. 7C, be generated by connecting the first end point EP1 of the first edge E1 to a first end point EP1 or a straight line portion of the second edge E2, in a shape perpendicular to the reference center line CL. However, depending on shapes of the first edge E1 and the second edge E2, the first normal line NH1 may be generated to connect the first end point EP1 of the second edge E2 to the first end point EP1 or a straight line portion of the first edge E1 in a shape perpendicular to the reference center line CL. As used herein, the term "normal line" refers to a line that is perpendicular to a given object, for example, the "reference center line CL" as discussed above.

A second normal line NH2 may be generated to connect the second end point EP2 of the second edge E2 to the second end point EP2 or a straight line portion of the first edge E1 in a shape perpendicular to the reference center line CL. In addition, according to an embodiment, the second normal line NH2 may be generated to connect the second end point EP2 of the first edge E1 to the second end point EP2 or a straight line portion of the second edge E2 in a shape perpendicular to the reference center line CL.

Figure 7D:
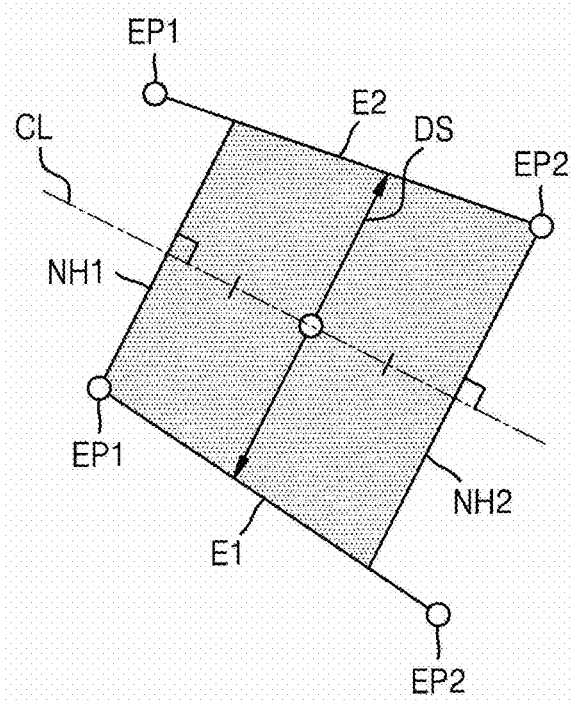

Referring to FIGS. 6 and 7D, the coupling region and the distance of the edge pair may be determined (S137-3). The coupling region may be determined to be (or defined as) a region surrounded by the first edge E1, the second edge E2, and the two normal lines NH1 and NH2. For example, the coupling region may correspond to the hatched region in FIG. 7D. The distance of the edge pair may be determined by a line which passes through the center point of the reference center line CL in the coupling region and is perpendicular to the reference center line CL. For example, a length DS of a line, which passes through the center point of the reference center line CL, is perpendicular to the reference center line CL, and meets the first edge E1 and the second edge E2, may correspond to the distance of the edge pair.

Referring to FIG. 6, whether the distance of the edge pair is equal to or less than the reference distance may be determined (S137-4). When the distance of the edge pair is equal to or less than the reference distance (Yes), the reference center line CL may be determined as the coupling edge (S137-5). Thereafter, the coupling filter may be applied to the coupling edge (S140). On the other hand, when the distance of the edge pair exceeds the reference distance (No), the second EUV mask image may be generated (S150).

Figure 8:
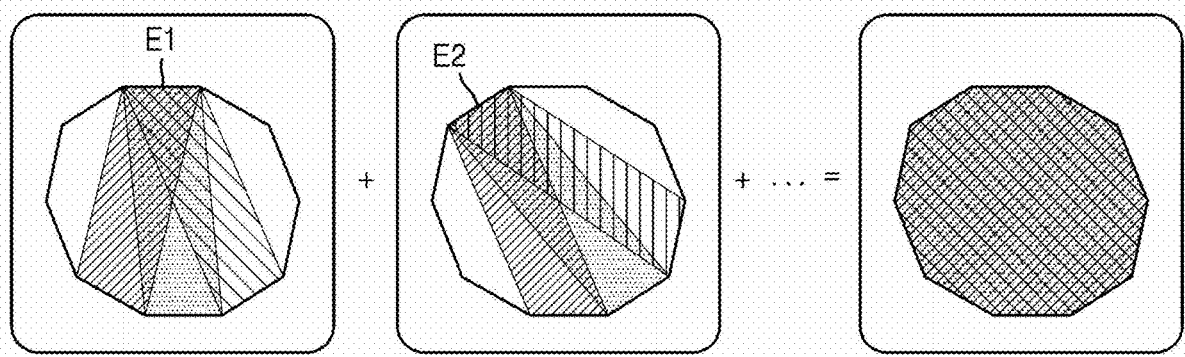
FIG. 8 is a conceptual diagram illustrating an example of applying setting of the coupling region to various types of patterns, in relation with operation S137 of determining the coupling edge by setting the coupling region in FIG. 6.

FIG. 8 is a conceptual diagram illustrating an example of determining the coupling region with respect to a pattern of a polygon shape, in relation with operation S137 of determining the coupling.

Referring to FIG. 8, as illustrated, at least three edges facing each other corresponding to the first edge E1 and three edge pairs corresponding thereto may be extracted from the layout of the pattern of a polygon shape including a plurality of edges. In addition, three coupling regions may be generated by using a method described above, and as illustrated by hatching, portions of the coupling regions may overlap each other. In the same manner, the coupling regions may be generated for the second edge E2. In this manner, by generating the coupling region for each edge of the polygon shape, the coupling region for the entire layout of the pattern of a polygon shape may be generated, as illustrated on the right side of FIG. 8. On the other hand, the coupling edges may be generated according to the distances of the edge pairs, and when the coupling edges are generated, by applying the coupling filters corresponding to the coupling edges, an error due to the coupling effect may be removed.

Figure 9B:
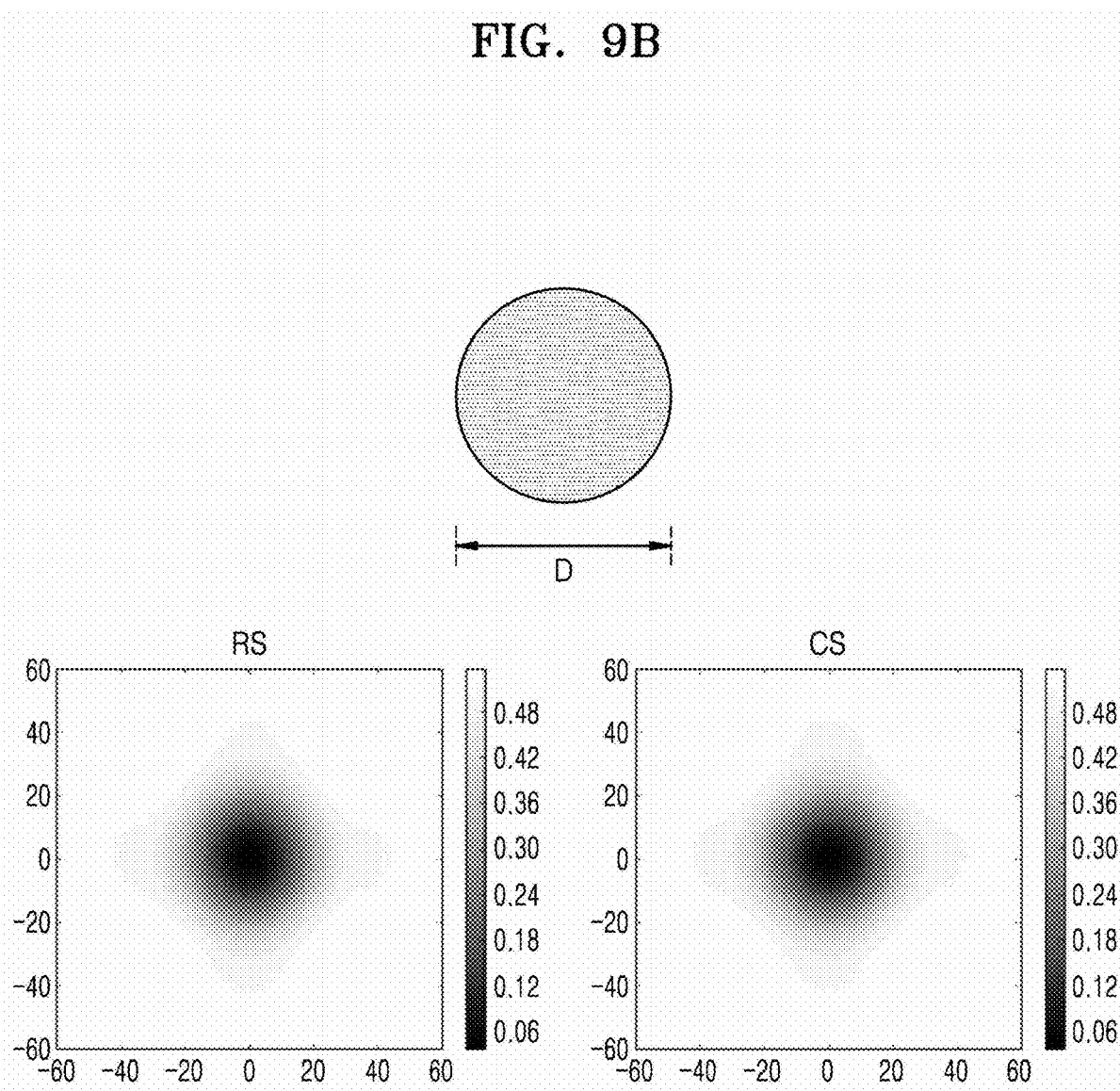
Figure 9C:
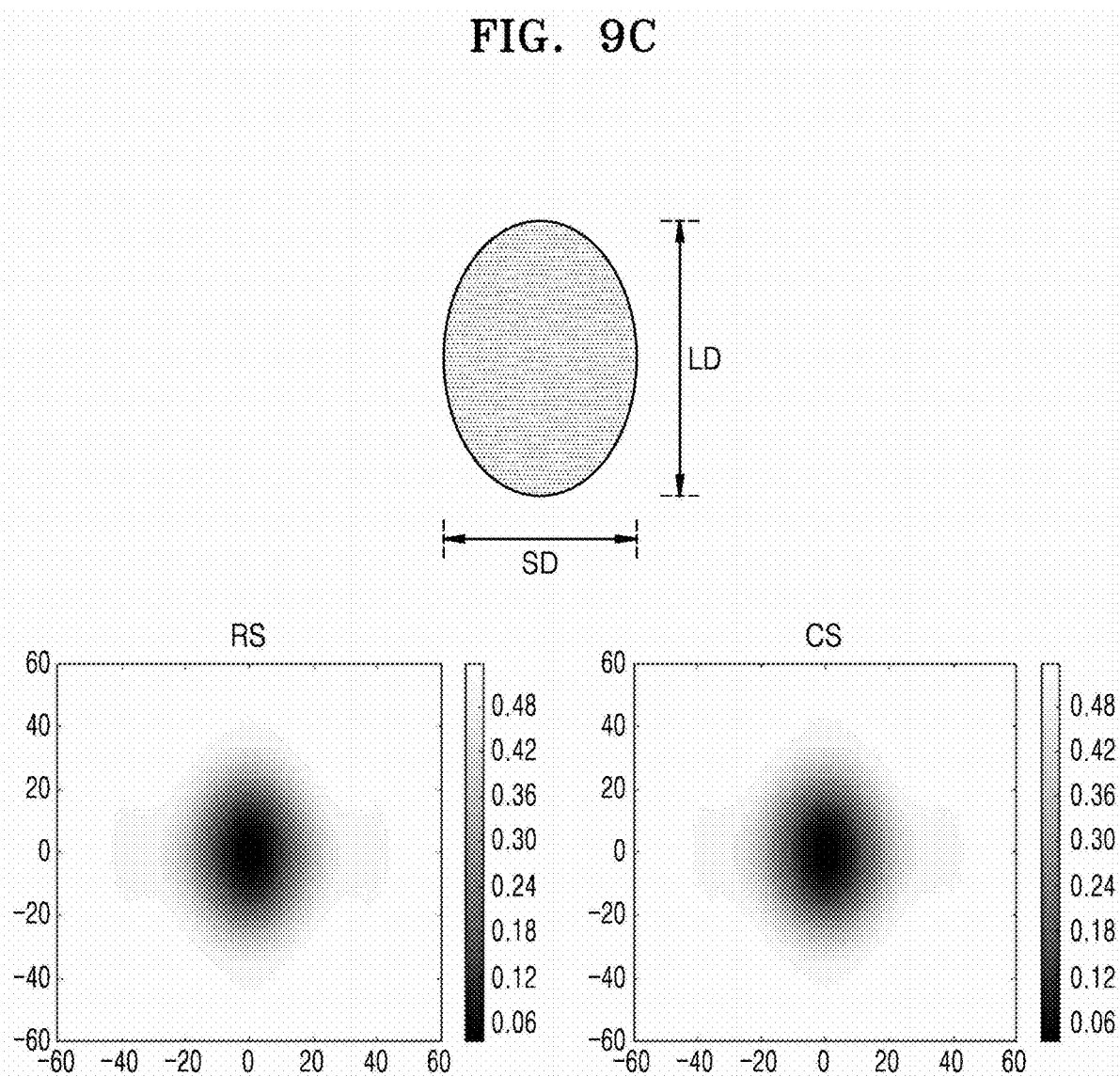

FIGS. 9A through 9C are conceptual diagrams for describing an effect of the EUV mask manufacturing method of FIG. 1 by using a maximum error ratio (MER), and FIGS. 9A through 9C respectively illustrate for patterns of a peanut shape, a circle shape, and an elliptic shape, EUV mask images obtained by using the rigorous simulation (RS on the left side of the figures) and EUV mask images obtained by simulation applied in the EUV mask manufacturing method according to the embodiment (hereinafter, 'compact simulation') (CS on the right side of the figures). The x axis and the y axis in each EUV mask image may be location coordinates, and a shaded strip extending in the y axis on the right side of each EUV mask image may denote an intensity value.

Referring to FIG. 9A, the pattern of a peanut shape may have a size in which a length L is about 54 nm, a left width W1 is about 25 nm, and a right side width W2 is about 31 nm. For the pattern of the peanut shape, a value calculated by using MER may be about 1.53. In this case, MER may be an abbreviation for maximum error ratio, and may denote a value of intensity difference between an image and an image represented in a number.

For reference, in the EUV mask manufacturing method using a comparison simulation considering only the case, with respect to the pattern of the peanut shape, when an angle of the edge pair is about 0°, that is, when two edges of an edge pair are parallel with each other, a value calculated by using MER may be about 1.70. Thus, the EUV mask manufacturing method according to the embodiment using a compact simulation, which considers the case when the angle of the edge pair is not about 0°, that is, when two edges of the edge pair are not parallel with each other, may improve the accuracy of the EUV mask image by about 11%, compared to the EUV mask manufacturing method using the comparison simulation.

Referring to FIG. 9B, the pattern of a circle shape may have a size in which a diameter D is about 31 nm. For the pattern of the circle shape, a value calculated by using MER may be about 1.92. On the other hand, in the EUV mask manufacturing method using the comparison simulation, a value calculated by using MER may be about 2.15. Thus, the EUV mask manufacturing method according to the embodiment using the compact simulation may improve the accuracy of the EUV mask image by about 10%, compared to the EUV mask manufacturing method using the comparison simulation.

Referring to FIG. 9C, the pattern of an elliptic shape may have a size in which a short axis SD is about 28 nm and a long axis LD is about 40 nm. For the pattern of the elliptic shape, a value calculated by using MER may be about 1.43. On the other hand, in the EUV mask manufacturing method using the comparison simulation, a value calculated by using MER may be about 1.58. Thus, the EUV mask manufacturing method according to the embodiment using the compact simulation may improve the accuracy of the EUV mask image by about 10%, compared to the EUV mask manufacturing method using the comparison simulation.

Figure 10A:
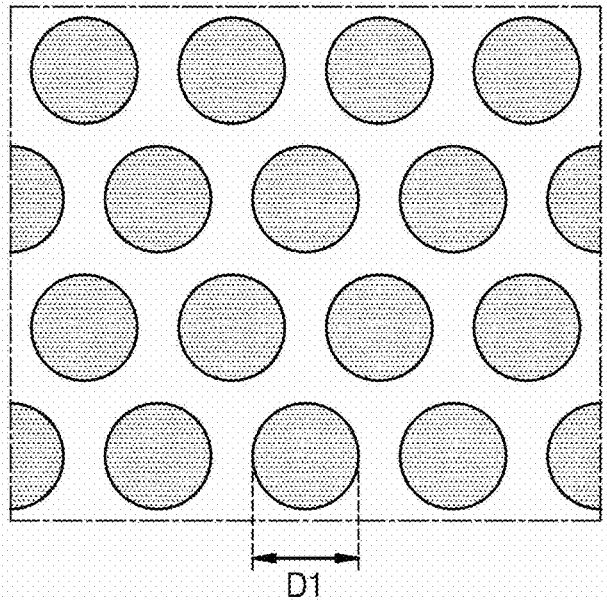
FIGS. 10A and 10B are conceptual diagrams for describing the effect of the EUV mask manufacturing method of FIG. 1 by using critical dimension (CD)-based root mean square (RMS) error (errRMS)
Figure 10B:
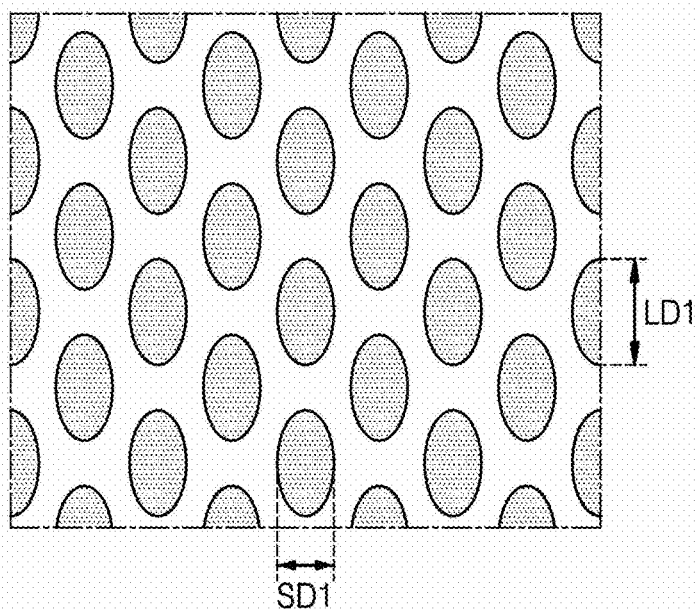

FIGS. 10A and 10B are conceptual diagrams for describing an effect of the EUV mask manufacturing method of FIG. 1 by using CD-based errRMS. FIG. 10A illustrates patterns of a circle shape formed on a wafer, and FIG. 10B illustrates patterns of an elliptic shape formed on a wafer.

Referring to FIG. 10A, the pattern of a circle shape formed on the wafer may have a size in which a diameter D1 is about 28 nm. For the pattern of the circle shape, a value calculated by using errRMS may be about 0.95. In this case, errRMS may be an abbreviation of RMS error, and may denote a value calculated for RMS by subtracting an average value or a reference value from measured CDs.

For reference, in the EUV mask manufacturing method using a comparison simulation considering only the case, with respect to the pattern of the circle shape, when an angle of the edge pair is about 0°, that is, when two edges of an edge pair are parallel with each other, a value calculated by using errRMS may be about 0.99. Thus, the EUV mask manufacturing method according to the embodiment using a compact simulation, which considers the case when the angle of the edge pair is not about 0°, for example, when two edges of the edge pair are not parallel with each other, may improve the CD accuracy of the pattern of the circle shape by about 5%, compared to the EUV mask manufacturing method using the comparison simulation.

Referring to FIG. 10B, the pattern of an elliptic shape formed on the wafer may have a size in which a short axis SD1 is about 24 nm and a long axis LD1 is about 28 nm. For the pattern of the elliptic shape, a value calculated by using errRMS may be about 1.05. On the other hand, in the EUV mask manufacturing method using the comparison simulation, a value calculated by using errRMS may be about 1.13. Thus, the EUV mask manufacturing method according to the embodiment using the compact simulation may improve the CD accuracy of the pattern of the elliptic shape by about 5%, compared to the EUV mask manufacturing method using the comparison simulation.

Figure 11:
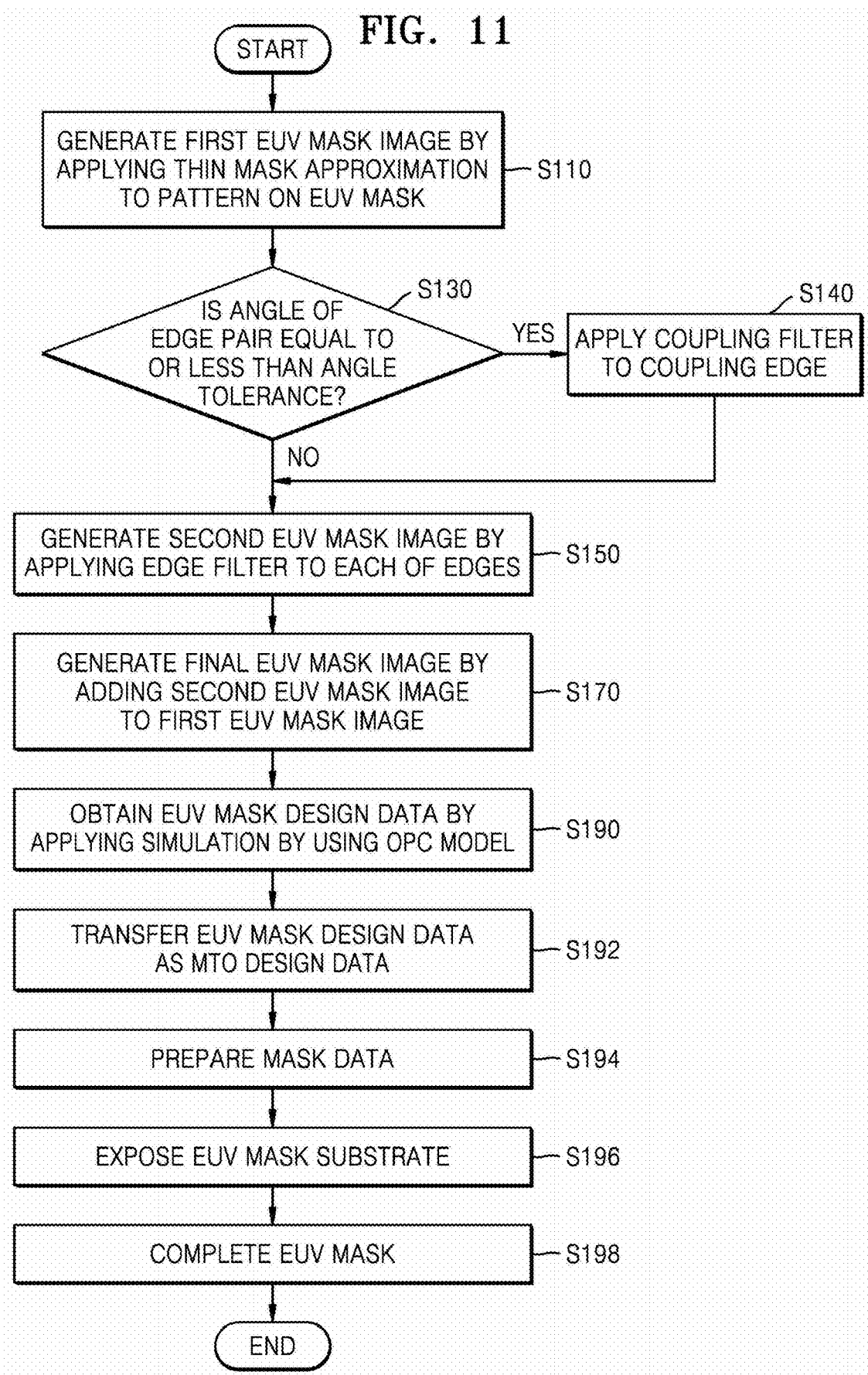
FIG. 11 is a conceptual flowchart of a process of the EUV mask manufacturing method, according to an embodiment.

FIG. 11 is a conceptual flowchart of a process of the EUV mask manufacturing method, according to an embodiment. Duplicate descriptions already given with reference to FIGS. 1 through 7D are briefly described or omitted.

Referring to FIG. 11, the EUV mask manufacturing method according to the embodiment may first perform the OPC method. The OPC method may include, for example, operation S110 of generating the first EUV mask image through operation S190 of obtaining design data for the EUV mask. Descriptions of operation S110 of generating the first EUV mask image through operation S190 of obtaining design data for the EUV mask may be the same as those of the EUV mask manufacturing method of FIG. 1.

After the OPC method is performed, the design data for the EUV mask may be transferred to the mask manufacturing team as the MTO design data (S192). In general, the MTO may denote a task of transferring the final EUV mask data obtained through the OPC method to the mask manufacturing team as a request for manufacturing the EUV mask. Thus, the MTO design data may eventually correspond to the final EUV mask data obtained by using the OPC method. The MTO design data may have a graphic data format that is used in electronic design automation (EDA) software, etc. For example, the MTO design data may have a data format such as graphic data system II (GDS2) and open artwork system interchange standard (OASIS).

After the MTO design data is transferred, an operation of mask data preparation (MDP) may be performed (S194). The MDP may include, for example, i) format conversion known as fracturing, ii) augmentation of a bar code for mechanical reading, a standard mask pattern for inspection, a job deck, or the like, and iii) a verification of automatic and manual methods. In this case, the job deck may denote an operation of creating a text file related to a series of commands such as arrangement information about multi-mask files, reference dose, exposure speed, exposure method, etc.

On the other hand, the format conversion (i.e., fracturing), may denote a process of dividing the MTO design data into respective regions and changing the MTO design data into a format for an electron beam writer. The fracturing may include, for example, data manipulation such as scaling, sizing of data, rotation of data, pattern reflection, and color reversal. In a conversion process by using the fracturing, data of a number of systematic errors that can occur somewhere in a process of transferring the design data to an image on a wafer may be corrected. The data compensation process for the systematic errors may be referred to as mask process correction (MPC) and may include, for example, line width adjustment called as a CD adjustment and an operation of increasing pattern arrangement accuracy, etc. Thus, the fracturing may be a process which can contribute to quality improvement of the final EUV mask and in addition, may be performed proactively for an operation of mask process correction. In this case, the systematic errors may be caused by distortions that occur in the exposure process, a mask development process, an etching process, a wafer imaging process, etc.

On the other hand, the MDP may include MPC. The MPC may be referred to, as described above, as a process for correcting an error occurring during the EUV exposure process, that is, a systematic error. In this case, the exposure process may be a concept generally including electron beam writing, developing, etching, baking, etc. In addition, data processing may be performed ahead of the exposure process. The data processing may be a kind of a preprocessing process for a mask data, and may include grammar checking on the mask data, exposure time prediction, etc.

After the mask data preparation is completed, an EUV mask substrate may be exposed based on the mask data (S196). In this case, the exposure may denote, for example, the electron beam writing. In this case, the electron beam writing may be performed by, for example, a gray writing method using a multi-beam mask writer (MBMW). In addition, the electron beam writing may also be performed by using a variable shape beam (VSB) writer.

On the on the other hand, after the MDP is completed, a process of converting the mask data into pixel data may be performed ahead of the exposure process. The pixel data may include data that is directly used for an actual exposure, and may include data on shapes of an object to be exposed and data on a dose allocated to each shape thereof. In this case, the data on the shape may include bit-map data in which the shape data, which is vector data, has been converted by rasterization, etc.

After the exposure process, a series of processes may be performed to complete the EUV mask (S198). The series of processes may include processes, for example, development, etching, cleaning, etc. In addition, the series of processes for EUV mask manufacturing may include a measurement process, a defect inspection, and a defect repair process. In addition, a pellicle application process may also be included. In this case, when it is verified in the final cleaning and inspection processes that there are no contamination particles or chemical stains, the pellicle application process may denote a process of attaching pellicles to a surface of the EUV mask to protect the EUV mask against subsequent contamination during the delivery and a service life of the EUV mask.

The method of FIG. 11 may also comprise steps for manufacturing a semiconductor device using the EUV mask design data. For example, the EUV mask design data may be used in a photolithography process for patterning a target layer of a wafer. Specifically, a target layer may be deposited on a semiconductor substrate, such as a silicon substrate. A photoresist layer may be deposited on the target layer. The photoresist may be selectively exposed to light via a photolithography process using the EUV mask. The photolithography process may irradiate the EUV mask with radiation so that light may be selectively transmitted to the photoresist on the wafer corresponding to the mask pattern.

The photoresist may then be etched in a positive or negative development process so that the mask pattern is transmitted to the photoresist pattern. The photoresist pattern may be used to etch the target layer on the wafer and thus the mask pattern may be transmitted to the target layer. The target layer may be the semiconductor substrate. The target layer may be a hard mask layer that is subsequently used to etch a layer below the mask layer. The target layer may be an insulator (a silicon oxide or nitride). Patterned openings formed in the insulator may be filled with a conductor (via metal or doped semiconductor deposition and chemical mechanical planarization (CMP), via epitaxial growth of a semiconductor material, etc.) to thereby fabricate a semiconductor device. The method of FIG. 11 may further comprise, subsequent to fabricating the semiconductor device, fabricating a semiconductor package by, for example, mounting the semiconductor device on a package substrate (alone or with other semiconductor devices) and encasing the semiconductor devices in a protective encapsulant. As used herein, "a semiconductor device" may refer either to a semiconductor chip or a semiconductor package including one or more semiconductor chips.

While the inventive concept has been particularly shown and described with reference to embodiments thereof, it will be understood that various changes in form and details may be made therein without departing from the spirit and scope of the following claims.

What is claimed is:

1. A manufacturing method comprising:
   generating a first EUV mask image by applying thin mask approximation to a pattern on an EUV mask;
   determining whether an angle of an edge pair constituted by two edges facing each other of edges of the pattern on the EUV mask is equal to or less than an angle tolerance;
   performing, in response to the angle of the edge pair being equal to or less than the angle tolerance, a process that includes:
   applying a coupling filter to a coupling edge;
   generating a second EUV mask image by applying an edge filter to each of the edges;
   generating a final EUV mask image by adding the first EUV mask image to the second EUV mask image; and
   generating an optical proximity correction (OPC) model based on the final EUV mask image, and obtaining EUV mask design data by performing a simulation using the OPC model; and
   manufacturing at least one of an EUV mask and a semiconductor device based on the EUV mask design data.

2. The method of claim 1, wherein the edge pair comprises a first edge having a first angle θ1 and a second edge having a second angle θ2 with respect to a reference line, and
   when the angle of the edge pair is equal to or less than the angle tolerance, an angle of the edge pair comprises a first case in which |θ1−θ2|=0, and a second case in which 0<|θ1−θ2|≤the angle tolerance,
   wherein, in the first case, a center line between the first edge and the second edge is set as the coupling edge, and
   wherein, in the second case, the coupling edge is set based on a coupling region located between the first edge and the second edge.

3. The method of claim 2, wherein setting the coupling edge based on the coupling region comprises:

generating a reference center line having an angle of (θ1+θ2)/2 with respect to the reference line between the first edge and the second edge;
generating two normal lines which are perpendicular to the reference center line, connect the first edge to the second edge, and are apart from each other; and
determining a region surrounded by the first edge, the second edge, and the two normal lines as the coupling region,
wherein, when a distance between the first edge and the second edge is equal to or less than a set reference distance, the reference center line is set as the coupling edge.

4. The method of claim 3, wherein the distance between the first edge and the second edge is determined by a straight line which passes through a center point of the reference center line and is perpendicular to the reference center line in the coupling region.

5. The method of claim 3, wherein each of the first edge and the second edge comprises a first end point, a second end point, and a straight line connecting the first end point and the second end point,
   wherein the two normal lines comprise:
   a first normal line connecting the first end point of the first edge to the first end point or a portion of the straight line of the second edge, or the first end point of the second edge to the first end point or a portion of the straight line of the first edge; and
   a second normal line connecting the second end point of the second edge to the second end point or a portion of the straight line of the first edge, or the second end point of the first edge to the second end point or a portion of the straight line of the second edge.

6. The method of claim 3, wherein the reference distance is in a range of 20 nm to about 30 nm.

7. The method of claim 2, wherein, in the first case, when a distance between the first edge and the second edge is equal to or less than a set reference distance, the center line is set as the coupling edge.

8. The method of claim 1, wherein the coupling filter is generated by subtracting the first EUV mask image and the second EUV mask image from a rigorous EUV mask image obtained by applying electromagnetic field simulation on the pattern corresponding to the edge pair, and
   the rigorous EUV mask image corresponds to a near field image of the EUV mask calculated on a back surface of the EUV mask immediately after light is reflected by the EUV mask.

9. The method of claim 1, wherein the OPC model comprises an optical OPC model and an OPC model for photo-resist (PR), and
   data of the final EUV mask image is used in the optical OPC model.

10. The method of claim 1, further comprising:
    after obtaining the EUV mask design data,
    transferring the EUV mask design data as mask tape-out (MTO) design data;
    preparing mask data based on the MTO design data; and
    completing the EUV mask by exposing an EUV mask substrate based on the mask data.

11. A manufacturing method comprising:
    generating a first EUV mask image by applying thin mask approximation to a pattern on an EUV mask;
    determining whether an angle of an edge pair constituted by two edges facing each other of edges of the pattern on the EUV mask is equal to or less than an angle tolerance, wherein the two edges include a first edge having a first angle θ1 and a second edge having a second angle θ2 with respect to a reference line;
performing, in response to the angle of the edge pair being equal to or less than the angle tolerance, a process that includes:
applying a coupling filter to a coupling edge;
generating a second EUV mask image by applying an edge filter to each of the edges;
generating a final EUV mask image by adding the first EUV mask image to the second EUV mask image;
generating an optical proximity correction (OPC) model based on the final EUV mask image, and obtaining EUV mask design data by performing simulation by using the OPC model;
transferring the EUV mask design data as mask tape-out (MTO) design data; and
preparing mask data based on the MTO design data; and
manufacturing at least one of an EUV mask and a semiconductor device by exposing an EUV mask substrate based on the mask data,
wherein when the angle is equal to or less than the angle tolerance, an angle of the edge pair comprises a first case in which |θ1−θ2|=0, and a second case in which 0<|θ1−θ2|≤the angle tolerance,
wherein, in the first case, a center line between the first edge and the second edge is set as the coupling edge, and
wherein in the second case, the coupling edge is set based on a coupling region located between the first edge and the second edge.

12. The method of claim 11, wherein setting the coupling edge based on the coupling region comprises:
generating a reference center line having an angle of (θ1+θ2)/2 with respect to the reference line between the first edge and the second edge;
generating two normal lines, which are respectively perpendicular to the reference center line, connect the first edge to the second edge, and are apart from each other; and
determining a region surrounded by the first edge, the second edge, and the two normal lines as the coupling region,
wherein, when a distance between the first edge and the second edge is equal to or less than a set reference distance, the reference center line is determined as the coupling edge.

13. The method of claim 12, wherein the distance between the first edge and the second edge is determined by a straight line which passes through a center point of the reference center line and is perpendicular to the reference center line in the coupling region, and
the reference distance is in a range of about 20 nm to about 30 nm.

14. The method of claim 12, wherein each of the first edge and the second edge comprises a first end point, a second end point, and a straight line connecting the first end point and the second end point,
wherein the two normal lines comprise:
a first normal line connecting the first end point of the first edge to the first end point or a portion of the straight line of the second edge, or the first end point of the second edge to the first end point or a portion of the straight line of the first edge; and
a second normal line connecting the second end point of the second edge to the second end point or a portion of the straight line of the first edge, or the second end point of the first edge to the second end point or a portion of the straight line of the second edge.

15. The method of claim 11, wherein the coupling filter is generated by subtracting the first EUV mask image and the second EUV mask image from a rigorous EUV mask image obtained by applying electromagnetic field simulation on the pattern corresponding to the edge pair, and
the rigorous EUV mask image corresponds to a near field image of the EUV mask calculated on a back surface of the EUV mask immediately after light is reflected by the EUV mask.

16. A manufacturing method comprising:
performing an optical proximity correction (OPC) method for obtaining EUV mask design data;
transferring the EUV mask design data as mask tape-out (MTO) design data;
preparing mask data based on the MTO design data; and
manufacturing at least one of an EUV mask and a semiconductor device by exposing an EUV mask substrate based on the mask data,
wherein the performing of the OPC method comprises:
generating a first EUV mask image by applying thin mask approximation to a pattern on an EUV mask;
determining whether an angle of an edge pair constituted by two edges facing each other of edges of the pattern on the EUV mask is equal to or less than an angle tolerance;
performing, in response to the angle of the edge pair being equal to or less than the angle tolerance, a process that includes:
applying a coupling filter to a coupling edge;
generating a second EUV mask image by applying an edge filter to each of the edges;
generating a final EUV mask image by adding the first EUV mask image to the second EUV mask image;
generating an OPC model based on the final EUV mask image; and obtaining EUV mask design data by performing simulation by using the OPC model.

17. The method of claim 16, wherein the edge pair comprises a first edge having a first angle θ1 and a second edge having a second angle θ2 with respect to a reference line, and
when the angle of the edge pair is equal to or less than the angle tolerance, an angle of the edge pair comprises a first case in which |θ1−θ2|=0, and a second case in which 0<|θ1−θ2|≤the angle tolerance,
wherein, in the first case, a center line between the first edge and the second edge is set as the coupling edge, and
wherein, in the second case, the coupling edge is set based on a coupling region located between the first edge and the second edge.

18. The method of claim 17, wherein setting of the coupling edge based on the coupling region comprises:
generating a reference center line having an angle of (θ1+θ2)/2 with respect to the reference line between the first edge and the second edge;
generating two normal lines, which are respectively perpendicular to the reference center line, connect the first edge to the second edge, and are apart from each other; and
determining a region surrounded by the first edge, the second edge, and the two normal lines as the coupling region, wherein, when a distance between the first edge and the second edge is equal to or less than a set reference distance, the reference center line is determined as the coupling edge.

19. The method of claim 16, wherein the coupling filter is generated by subtracting the first EUV mask image and the second EUV mask image from a rigorous EUV mask image obtained by applying electromagnetic field simulation to the pattern corresponding to the edge pair.

20. The method of claim 19, wherein the rigorous EUV mask image is obtained by using rigorous coupled-wave analysis (RCWA) or finite difference time domain (FDTD) simulation, and corresponds to a near field image of the EUV mask calculated on a back surface of the EUV mask immediately after light is reflected by the EUV mask.

* * * * *